(12) United States Patent
Ono et al.

(10) Patent No.: US 6,507,308 B1
(45) Date of Patent: Jan. 14, 2003

(54) MICROWAVE DETECTOR

(75) Inventors: Hisao Ono, Tokyo (JP); Yuichi Kajita, Tokyo (JP)

(73) Assignee: Yupiteru Industries Co., Ltd. (JP)

( * ) Notice: Subject to any disclaimer, the term of this patent is extended or adjusted under 35 U.S.C. 154(b) by 0 days.

(21) Appl. No.: 09/546,928

(22) Filed: Apr. 11, 2000

Related U.S. Application Data

(63) Continuation-in-part of application No. 09/373,459, filed on Aug. 12, 1999, now Pat. No. 6,329,735.

(30) Foreign Application Priority Data

Sep. 10, 1999 (JP) ............................................ 11-256767
Dec. 22, 1999 (JP) ............................................ 11-365103

(51) Int. Cl.[7] ................................................ G01S 7/40
(52) U.S. Cl. ...................................... 342/20; 342/195
(58) Field of Search ........................... 342/20, 89, 175, 342/195; 455/226.1, 226.2, 226.3, 226.4, 227, 228

(56) References Cited

U.S. PATENT DOCUMENTS

| | | | |
|---|---|---|---|
| 4,313,216 A | 1/1982 | Jaeger et al. | 455/226 |
| 4,315,261 A | 2/1982 | Mosher | 342/20 |
| 4,626,857 A | 12/1986 | Imazeki | 342/20 |
| 4,668,952 A | 5/1987 | Imazeki et al. | 342/20 |
| 4,954,828 A | 9/1990 | Orr | 342/20 |
| 5,049,884 A | 9/1991 | Jaeger et al. | 342/20 |
| 5,049,885 A | 9/1991 | Orr | 342/20 |
| 5,068,663 A | 11/1991 | Valentine et al. | 342/20 |
| 5,079,553 A | 1/1992 | Orr | 342/20 |
| 5,268,689 A | 12/1993 | Ono et al. | 342/20 |
| 5,305,007 A | 4/1994 | Orr et al. | 342/20 |
| 5,389,930 A | 2/1995 | Ono | 342/20 |
| 5,461,383 A | 10/1995 | Ono et al. | 342/20 |
| 5,666,120 A | 9/1997 | Kline et al. | 342/20 |

Primary Examiner—Bernarr E. Gregory
(74) Attorney, Agent, or Firm—Marger Johnson & McCollom, P.C.

(57) ABSTRACT

A microwave detector for detecting faint detection target microwave signals is constructed from a heterodyne-type reception portion equipped with an antenna for picking up microwave signals, a local oscillator for repeatedly carrying out a sweep operation, and a mixer for frequency mixing the output from the antenna with the output from the local oscillator, wherein the heterodyne reception portion outputs detected wave signals based on the output from the mixer; a digital processing portion which receives the detected wave signals outputted from the reception portion, wherein the digital processing portion is designed to output a High pulse when the level of the detected wave signals reaches or exceeds a prescribed reference level, and a Low pulse when the level of the detected wave signals is below the reference level; a sweep control portion for controlling the sweep operation of the local oscillator based on the High and Low pulses outputted from the digital processing portion; and a judgement portion for judging whether or not a detection target microwave signal has been detected based on at least one measured or calculated quantity such as the total time High pulses are outputted by the digital processing portion, the total time a sweep stop is carried out by the sweep control portion, the total time required to complete a sweep, or a relationship between the total time High pulses are outputted and the total time Low pulses are outputted (e.g., the duty thereof). Further, a separate judgement-use digital signal generating portion may be provided to enable sweep control and detection judgements to be carried out by separately generated digital signals, and the detection accuracy can be further improved by dividing each sweep into a plurality of sampling regions and by providing a signal discrimination portion or signal discrimination function.

19 Claims, 20 Drawing Sheets

(a)

| AD Value | Number of Samplings |
|---|---|
| n | 1 |
| n−1 | 1 |
| n−2 | 1 |
| n−3 | 10 |
| n−4 | 1 |
| n−5 | 1 |
| n−6 | 1 |

(b)

| AD Value | Number of Samplings |
|---|---|
| n | 1 |
| n−1 | 1 |
| n−2 | 2 |
| n−3 | 3 |
| n−4 | 3 |
| n−5 | 2 |
| n−6 | 1 |

(a)

| AD Value | Number of Samplings |
|---|---|
| n | 1 |
| n−1 | 1 |
| n−2 | 2 |
| n−3 | 3 |
| n−4 | 3 |
| n−5 | 2 |
| n−6 | 1 |

(b)

| AD Value | Number of Samplings |
|---|---|
| n | 1 |
| n−1 | 1 |
| n−2 | 10 |
| n−3 | 10 |
| n−4 | 10 |
| n−5 | 10 |
| n−6 | 1 |

| AD Value | Number of Samplings |
|---|---|
| n | 1 |
| n−1 | 1 |
| n−2 | 2 |
| n−3 | 3 |
| n−4 | 3 |
| n−5 | 2 |
| n−6 | 1 |

(b)

| AD Value | Number of Samplings |
|---|---|
| n | 1 |
| n−1 | 1 |
| n−2 | 1 |
| n−3 | 10 |
| n−4 | 1 |
| n−5 | 1 |
| n−6 | 1 |

FIG.19
(a) 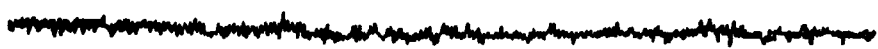
(b) 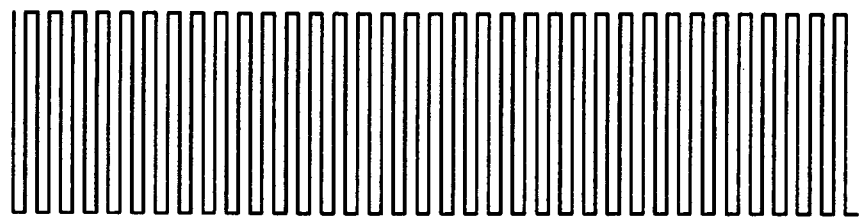
(c) 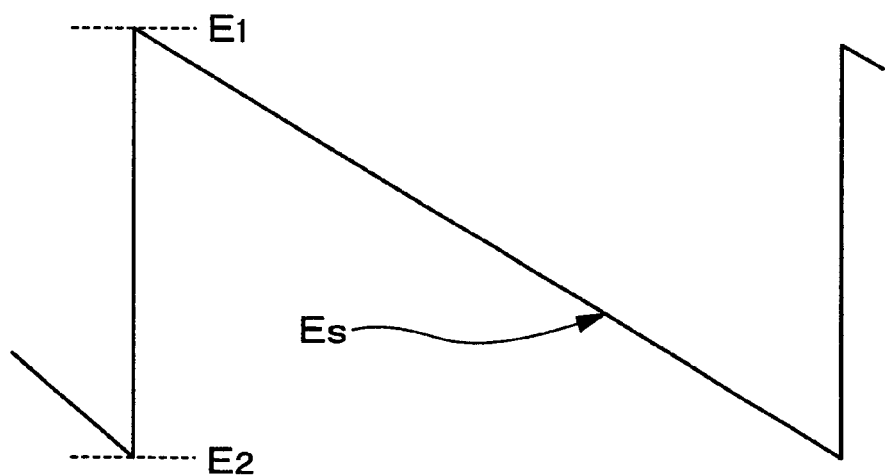
(d) 

FIG.20
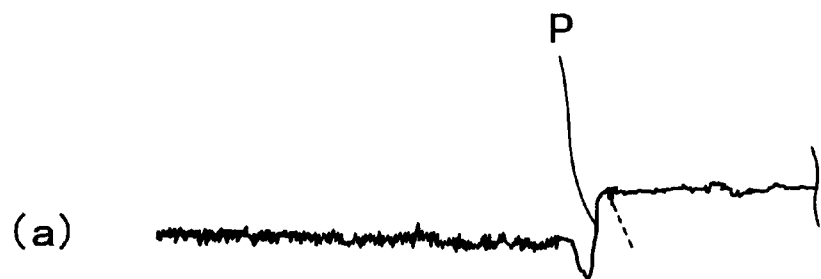
(a)
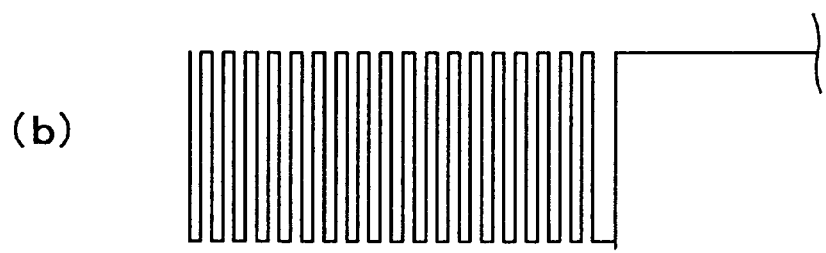
(b)
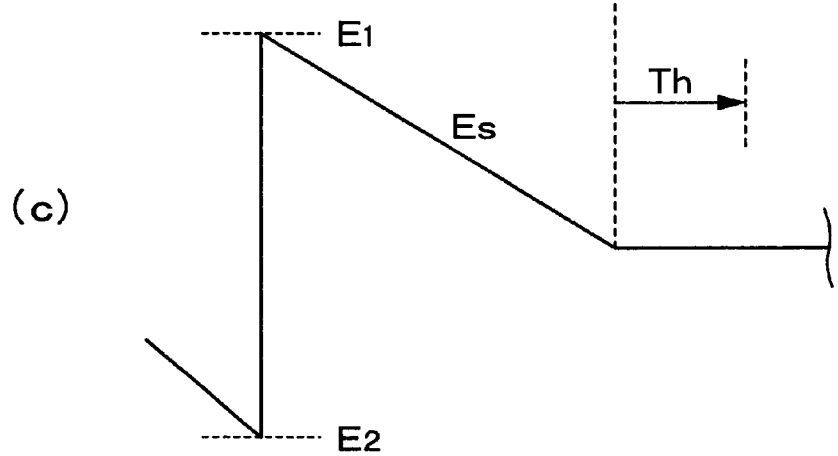
(c)
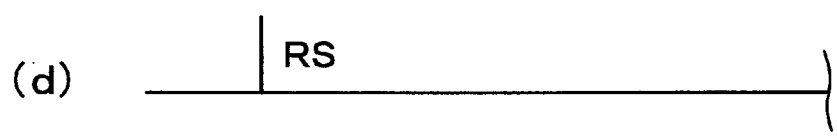
(d)

MICROWAVE DETECTOR

RELATIONSHIP TO OTHER APPLICATIONS

This is a continuation-in-part application to copending, commonly assigned U.S.A. patent application Ser. No. 09/373,459, filed on Aug. 12, 1999, and which was issued as U.S. Pat. No. 6,329,735 B1 on May 29, 2001, the disclosure of which is herein incorporated by reference in its entirety.

This application claims priority from Japanese patent application No. 11-256767, filed on Sep. 10, 1999 with the Patent Office of the Japanese Government, which patent application is incorporated herein by reference.

This application claims priority from Japanese patent application No. 11-365103, filed on Dec. 22, 1999 with the Patent Office of the Japanese Government, which patent application is incorporated herein by reference.

BACKGROUND OF THE INVENTION

1. Field of the Invention

The present invention relates to a microwave detector, and in particular relates to an improved microwave detector structure capable of detecting very faint detection target microwave signals even when such microwave signals are buried within circuit noise.

2. Description of the Prior Art

Microwave detectors which generate an alarm upon detecting the specific microwave signals emitted by radar type speed measurement devices are known in the prior art. In general, such microwave detectors employ various heterodyne type reception systems to detect target microwave signals from the microwaves picked up by the antenna.

In microwave detectors equipped with heterodyne reception systems, the antenna output (reception signal) and the local oscillator output undergo frequency mixing in a mixer, and then after the intermediate frequency signal obtained by such mixing is amplified to an appropriate level, a signal process is carried out to convert detection target microwave signals into prescribed signals.

Namely, after carrying out frequency mixing and amplifying a desired band signal with an intermediate frequency amplifier, the intermediate frequency signal obtained thereby will have either a peak waveform when target microwave frequency signals are received, or a faint noise waveform when no target microwave frequency signals are received.

Accordingly, by detecting the peak waveform with a wave detector and outputting a digital pulse when the level of the peak waveform reaches or exceeds a prescribed threshold value, such arrangement makes it possible to output pulses only when detection target microwave signals are received, and this forms the basis of the detection process. Further, in the case where amplification is carried out with an amplifier having an amplification factor large enough to create noise saturation, the noise component will alternately appear as positive and negative high frequency signals, but when a detection target microwave frequency signal is received, the noise saturation will continue in either its positive or negative state without change, and this enables a pulse having a prescribed width to be outputted.

Incidentally, because the oscillation frequency of normal local oscillators repeatedly sweeps the frequency band occupied by the detection target microwave frequency, in the case where a single detection target microwave frequency signal is present, the intermediate frequency signal will output two peaks having a desired spacing. In this connection, the determination of whether or not such spacing forms a prescribed spacing is used as a means for judging whether or not a real microwave signal from a detection target is present.

Now, in order to accurately determine whether the received microwave signal is a real detection target microwave signal or a false signal, a signal in which the detection characteristics (i.e., S-curve characteristics) accurately reappear is inputted into a microcomputer, but because this signal that is inputted into the computer must have a cycle rate that is two-times or higher than the frequency of the S-shaped waveform, an excessive load will be placed on the circuit. In this connection, because the S-shaped waveform is not a sine wave, the signal described above generally uses a frequency as high as possible.

Further, because the reproducibility of the S-shaped waveform has a huge effect on the resolution of an A/D converter, the signals inputted into the microcomputer require the use of a high performance device such as a DSP or the like. Furthermore, because the amount of memory required depends on the resolution of the A/D converter, high resolution requires a large amount of memory. Moreover, the provision of elements needed to satisfy such requirements leads to high costs, and this makes it difficult to construct accurate microwave detectors.

On the other hand, there is another type of microwave detector known in the prior art, in which the oscillation frequency of the local oscillator carries out a sweeping operation until a detection target microwave frequency signal is detected, whereupon the oscillation frequency of the local oscillator is switched from a sweeping mode to a fixed frequency mode (i.e., a sweep stop is carried out).

In this way, in the case where a real microwave signal from a detection target is received, because the detection of the microwave signal will continue without alteration of the frequency state, by measuring the amount of time the sweep was temporarily suspended, the microwave detector can be arranged to use such time measurements as a base for judging whether or not a real microwave signal from a detection target has been received. In the case where random microwave signals such as noise or the like is received by this type of microwave detector, because such random signals will immediately disappear upon fixing the oscillation frequency of the local oscillator (i.e., upon stopping the sweep), the fixed state of the local oscillator will be released to allow the local oscillator to return to a sweeping mode. Accordingly, the local oscillator will be released from the fixed state (sweep suspension state) before the prescribed time interval has elapsed, and this makes it possible to prevent false alarms. An example of a microwave detector which uses this basic principle is disclosed in Japanese Laid-Open Patent Application No. HEI 7-35845.

Now, because this detection method only involves measuring the sweep suspension time interval, there is no need to carry out complicated waveform processing operations, and this makes it possible to construct a microwave detector having a relatively simple structure. However, in the case where a very faint microwave signal is received, such signal will become buried in the circuit noise. As a result, even when such faint microwave signal is a real microwave signal from a detection target, the sweep suspension state of the local oscillator will be released before the prescribed time interval has elapsed. Further, if the sweep suspension time is simply shortened in order to increase sensitivity, there will also be an increased risk of malfunctions due to degradation of the pulse characteristics and the like.

Further, when faint detection target microwave signals are received, the resulting output level may be relatively larger than the noise level, but the weak level of such faint microwave signals makes it difficult to accurately discriminate the case where a faint detection target microwave signal is present from the case where there is just noise with no microwave signals.

SUMMARY OF THE INVENTION

With a view toward overcoming the problems of the prior art described above, one object of the present invention is to provide a low-cost microwave detector which can carry out a highly sensitive detection of faint detection target microwave signals using a simple structure to enable accurate detections with few false alarms. Further, another object of the present invention is to make it possible to detect faint detection target microwave signals using a simple arithmetic processing portion and a small capacity memory.

One way to achieve the objects of the present invention is to construct a microwave detector from a heterodyne-type reception portion equipped with an antenna for picking up microwave signals, a local oscillator for repeatedly carrying out a sweep operation, and a mixer for frequency mixing the output from the antenna with the output from the local oscillator, wherein the heterodyne reception portion outputs detected wave signals based on the output from the mixer; a digital processing portion which receives the detected wave signals outputted from the reception portion, wherein the digital processing portion is designed to output a High pulse when the level of the detected wave signals reaches or exceeds a prescribed reference level, and a Low pulse when the level of the detected wave signals is below the reference level; a sweep control portion for controlling the sweep operation of the local oscillator based on the High and Low pulses outputted from the digital processing portion; and a judgement portion for judging whether or not a detection target microwave signal has been detected based on at least the total time of the High pulses.

Here the term "based on at least the total time High pulses are outputted" means that in addition to of course being able to carry out judgements based on the total time the detected wave signal from the reception portion reached or exceeded the prescribed reference level of the digital processing portion, it is also possible to carry out judgements based on a normalized figure calculated by taking the ratio or the like of the total time the detected wave signal reached or exceeded the reference level to the total time the detected wave signal was below the reference level.

Another way to achieve the objects of the present invention is to construct a microwave detector from a heterodyne-type reception portion equipped with an antenna for picking up microwave signals, a local oscillator for repeatedly carrying out a sweep operation, and a mixer for frequency mixing the output from the antenna with the output from the local oscillator, wherein the heterodyne reception portion outputs detected wave signals based on the output from the mixer; a digital processing portion which receives the detected wave signals outputted from the reception portion, wherein the digital processing portion is designed to output a High pulse when the level of the detected wave signals reaches or exceeds a prescribed reference level, and a Low pulse when the level of the detected wave signals is below the reference level; a sweep control portion for controlling the sweep operation of the local oscillator based on the High and Low pulses outputted from the digital processing portion; a judgement-use digital pulse generating portion which receives the detected wave signals outputted from the reception portion, wherein the judgement-use digital pulse generating portion is designed to output a High pulse when the level of the detected wave signals reaches or exceeds a prescribed threshold level, and a Low pulse when the level of the detected wave signals is below the threshold level; and a judgement portion for judging whether or not a detection target microwave signal has been detected based on at least the total time of the High pulses outputted by the judgement-use digital pulse generating portion.

In other words, in the first microwave detector structure described above, digital signals outputted by a digital processing portion are used by both a sweep control portion and a judgement portion, but in the second microwave detector structure described above, the sweep control portion uses the digital signals outputted by the digital processing portion, while the judgement portion uses judgement-use digital signals outputted by a separately provided judgement-use digital signal generating portion. In this connection, the operating principle for both structures is essentially the same. However, the second structure is advantageous because the threshold level used for making judgements can be appropriately set at a value different from the reference value used in controlling the sweep operations. Of course, the threshold level and the reference value may be set at the same value.

Still another way to achieve the objects of the present invention is to construct a microwave detector from a heterodyne-type reception portion equipped with an antenna for picking up microwave signals, a local oscillator for repeatedly carrying out a sweep operation, and a mixer for frequency mixing the output from the antenna with the output from the local oscillator, wherein the heterodyne reception portion outputs detected wave signals based on the output from the mixer; a digital processing portion which receives the detected wave signals outputted from the reception portion, wherein the digital processing portion is designed to output a High pulse when the level of the detected wave signals reaches or exceeds a prescribed reference level, and a Low pulse when the level of the detected wave signals is below the reference level; a sweep control portion which receives the output from the digital processing portion and carries out a sweep stop when High pulses are received; and a judgement portion for judging whether or not a detection target microwave signal has been detected based on whether or not the total time over which sweep stops are carried out at the same position reaches or exceeds a prescribed sweep stop reference time.

Here, the term "same position" may mean the same frequency or the same sweep voltage corresponding thereto, and as described below in the detailed description of the preferred embodiments, the sweep voltage may of course be the same as the voltage value (level) obtained by sampling with the A/D converter, for example, using the same memory regions for carrying out memory storage over a single sweep. Further, the "same position" may include the case where a prescribed width compensation is allowed. In other words, in order to cover the case where sweep stops are due to the same microwave signal, rather than being limited to exactly the same point, the "same position" includes the case where the sweep stops occur in the same fixed range (such as the divided regions in the embodiments described below).

Yet another way to achieve the objects of the present invention is to construct a microwave detector from a heterodyne-type reception portion equipped with an antenna for picking up microwave signals, a local oscillator for repeatedly carrying out a sweep operation, and a mixer for frequency mixing the output from the antenna with the output from the local oscillator, wherein the heterodyne reception portion outputs detected wave signals based on the output from the mixer; a digital processing portion which receives the detected wave signals outputted from the reception portion, wherein the digital processing portion is designed to output a High pulse when the level of the detected wave signals reaches or exceeds a prescribed reference level, and a Low pulse when the level of the detected wave signals is below the reference level; a sweep control portion which receives the output from the digital processing portion and carries out a sweep stop when High pulses are received; and a judgement portion for judging whether or not a detection target microwave signal has been detected based on whether or not the total time required for a single sweep reaches or exceeds a prescribed sweep reference time.

Now, in each of the microwave detector structures described above, the reference level used for comparisons by the digital processing portion is preferably set at a level which enables detection of a portion of the noise outputted by the reception portion. In this regard, the reference level must be set below the maximum level of the noise in order to detect a portion of such noise, with the preferred reference level setting being at the central level (average level) of the noise. In particular, establishing the reference level at the central level of the noise can be simply carried out by establishing the reference level at the average of the maximum and minimum levels, or by establishing the reference level at the specific level where there is a existence probability of 1/2 for signals above and below such reference level. In this way, the reference level can be set in accordance with the fluctuations of the noise level.

Accordingly, in the microwave detector structures described above, because the reference level established for the detected wave signals outputted from the reception portion can be made smaller than the amplitude of the circuit noise waveform, it becomes possible to detect digitally processed signals even in such cases where a faint detection target microwave signal is buried in the noise waveform or has a signal level close to the noise level.

Similarly, for the same reasons explained above, the threshold level used for comparisons by the judgement-use digital pulse generating portion is preferably set at a level which enables detection of a portion of the noise outputted by the reception portion.

However, even though the reference level and the threshold level are preferably established at a level which enables detection of a portion of the noise as described above, the present invention is not limited to this arrangement, and it is of course possible to set the reference level and the threshold level at levels higher than the maximum value of the noise level. In other words, even when the reference level and the threshold level are established at values higher than the maximum value of the noise level, if the reference level and the threshold level are established close to the maximum value of the noise level, then it becomes possible to detect faint microwave signals close to the noise level so long as such microwave signals have levels at or above the reference level or threshold level.

However, if the reference level or the threshold level is established at a level far higher than the maximum level of the noise, it will not be possible for faint detection target microwave signals to reach or exceed such reference level or threshold level, and because this makes it impossible to detect such faint microwave signals, the detection accuracy will be lowered. Accordingly, reference levels and threshold levels much higher than the maximum level of the noise are not preferred. However, so long as detection of faint microwave signals is possible, the reference level and the threshold level may be appropriately established to suit particular detection requirements.

In this connection, it is of course understood that the detection levels established with a sufficient margin above the noise level used in prior art microwave detectors for the purpose of detecting normal reception strength microwave signals are too high to be used as the reference level or threshold level for detecting faint detection target microwave signals according to the present invention.

Furthermore, even though there is a relationship between the noise level and the reference level and threshold level, because the level of the noise changes every moment, when each sweep is examined individually, the maximum value of the noise level in each sweep will not always match each other. Accordingly, when the reference level or the threshold level is established at a level which enables detection of a portion of the noise outputted from the reception portion, there will occasionally be times where the noise level does not reach or exceed the reference level or threshold level during one entire sweep, but because a portion of the noise will be detected during the other sweeps, such case is included in the term "established at a level which enables detection of a portion of the noise" used in the description of the microwave detector structures given above.

Of course, because the noise level undergoes slight fluctuations, such fluctuations are preferably taken into consideration when the reference level and the threshold level are established. In this regard, as was already mentioned above, the reference level and the threshold level are preferably set at the average value of the noise level to make it possible to carry out detection operations even when there are fluctuations in the overall noise level.

In the present invention, faint detection target microwave signals buried in the noise waveform outputted from the reception portion can be discriminated from such noise waveform by comparing the output of the reception portion during a particular measurement with the output of the reception portion during the time no microwave signals are received over either the entire sweep or a portion of the sweep performed by the local oscillator at a prescribed frequency, whereby it becomes possible to judge whether or not a faint detection target microwave signal has been received. In this regard, the term "buried in the noise waveform" includes of course the case where the level of the microwave signal is below the maximum noise level, and also includes the case where the level of the microwave signal is close enough to the noise level to make it difficult to discriminate the microwave signal from the noise.

In other words, because the output of the reception portion during the time no microwave signals are received is the noise output of the reception portion, the level of such output will fluctuate at a high frequency. Further, the noise will alternate between levels that reach or exceed the reference level or threshold level and levels that lie below the reference level or threshold level. Accordingly, the digitalization of such noise will create alternating High and Low pulses, and due to the nature of such noise, there will be a fixed ratio between the High and Low pulses over one entire sweep. In this regard, in the case where either the High or Low pulses have a fixed low occurrence probability, the term "fixed ratio" includes such probability value.

On the other hand, when a detection target microwave signal is received, the reference level or the threshold level is continuously reached or exceeded. Namely, even though both the noise level and the detection target microwave signal level will reach or exceed the reference level or threshold level, the time over which the reference level or threshold level is reached or exceeded will be relatively longer for the case where a detection target microwave signal is received than for the case where only noise is present. Accordingly, if the output of the reception portion during the time that no microwave signal is received and only noise is present is established as a reference, it becomes possible to make the judgement that a microwave signal has been received in the case where the measured output from the reception portion is different from such reference by a prescribed shift or greater.

Further, the operations performed by the digital processing portion and the judgement portion on the detected wave signals outputted from the reception portion are preferably carried out over prescribed sampling intervals. When sampling is carried out in this way, operations can be simplified by storing the number of samplings of each digital signal. Namely, the actual total times of each digital signal can be calculated simply by multiplying the number of samplings of each digital signal by the sampling time.

Furthermore, the digital processing portion in each of the microwave detector structures described above may be equipped with a discrimination function which makes it easy to discriminate whether the detected wave signals outputted from the reception portion have a high probability of being detection target microwave signals or a high probability of being noise. Further, the judgement-use digital pulse generating portion may be equipped with a discrimination function which makes it easy to discriminate whether the detected wave signals outputted from the reception portion have a high probability of being detection target microwave signals or a high probability of being noise. In this way, by eliminating the need to carry out various calculations (e.g., integration intervals, sweep times, etc.) based on the reception output having a high probability of being noise, the effects of noise can be reduced to enable highly accurate detection of detection target microwave signals. Moreover, during the time that the reception portion outputs signals having a high probability of being noise with no received microwave signals, because there are no signals requiring calculations, it becomes possible to reduce the memory capacity required for storing data used in such calculations.

Alternatively, instead of providing the digital processing portion with a discrimination function, the microwave detector structures described above may be provided with a discrimination portion which carries out a discrimination process on the output from the digital processing portion to discriminate whether the detected wave signals outputted from the reception portion have a high probability of being detection target microwave signals or a high probability of being noise.

In this way, the signals used in carrying out microwave signal detection judgements may be different from the digital signals used in carrying out sweep control, and because this eliminates the need to carry out various calculations (e.g., integration intervals, sweep times, etc.) based on the reception output having a high probability of being noise, the effects of noise can be reduced to enable highly accurate detection of detection target microwave signals. Further, this arrangement also makes it possible to reduce the required memory capacity.

Furthermore, if the microwave detector structures described above carry out a prescribed plurality of sweeps and the judgement results thereof are integrated to form integrated judgement data, the judgement of whether or not a detection target microwave signal has been detected may be carried out based on such integrated judgement data.

For example, even in the case where the reception portion output signal having a high probability of being a microwave signal (i.e., the output signal which reaches or exceeds the reference level or threshold level) only occurs over a short continuous time interval for each sweep, when a plurality of sweeps is examined, the output signal can be assumed to have a high probability of being a detection target microwave signal in the case where the output signal repeatedly reappears at the same position. On the other hand, in the case where an output signal is detected during one sweep but does not reappear in subsequent sweeps, such output signal can be assumed to be due to interference waves.

Furthermore, in each of the microwave detector structures described above, the sweep range of each sweep can be divided into a prescribed plurality of divided sweep regions, and a judgement process can be carried out for each divided sweep region Accordingly, by dividing the sweep in this way, the effects caused by the dispersion of the sweep interval can be reduced, and this makes it possible to carry out highly accurate detection of microwave signals.

Further, in the microwave detector structures described above, the digital processing portion can be equipped with a discrimination function which makes it easy to discriminate whether the detected wave signals outputted from the reception portion have a high probability of being detection target microwave signals or a high probability of being noise, and a memory storing function which creates memory regions corresponding to the divided sweep regions in which the detected wave signals outputted from the reception portion have been discriminated as having a high probability of being detection target microwave signals, and stores data related to the detected wave signals in the corresponding memory regions, and the judgement portion can be arranged to carry out judgements based on the data stored in the memory regions created for the divided sweep regions. In this regard, these functions are included in the signal selection function described below in the embodiments of the present invention.

In this way, because memory regions for storing data related to the output signals is only created for a portion of the divided sweep regions for a single sweep, it is possible to reduce the amount of memory used, and this makes it possible to construct a low-cost microwave detector.

In this case, the data that is stored in the memory region may include data on the number of sweeps related thereto. Further, the number of sweeps related to the data in each memory region may be stored in the same memory region or in a different memory region.

In other words, in the case where a prescribed signal is outputted, when a memory region is created and data is stored therein, the number of sweeps carried out to obtain the data in such memory regions will be different depending on the corresponding divided sweep region. Further, even when data such as the continuation time or integration interval are the same, because the number of sweeps carried out to obtain such data is different for each divided sweep region, output signals within each divided sweep region will have different probabilities of being a microwave signal. Accordingly, by storing the number of sweeps it becomes possible to carry out judgements at an even higher accuracy level.

Furthermore, a clearing function may be provided to clear the memory regions corresponding to sweep regions that have been judged to receive no detection target microwave signals. Namely, in the case where no microwave signals are received, because the data stored at such time is based on noise, by clearing such data, it becomes possible to reduce the effects of noise when making microwave detection judgements thereafter. Further, because this eliminates the need to maintain useless data in the memory, it is possible to carry out the judgement process using a small capacity memory.

Further, in each of the microwave detector structures described above, the sweep control portion may be designed to change the sweep operation performed by the local oscillator in a stepwise manner based on the High or Low pulses outputted from the digital processing portion. In this regard, in the embodiments described below, such stepwise change of the sweep operation is carried out by controlling the sweep voltage with a CPU in order to improve the operation performance.

BRIEF DESCRIPTION OF THE DRAWINGS

FIGS. 12(a) and 12(b) show data tables used in describing still another modification of the microwave detector according to the first embodiment of the present invention.

FIGS. 19(a)~19(d) show output waveform diagrams for each of the circuit elements of the microwave detector according to the fifth embodiment of the present invention in the case where no detection target microwave signals are received.

FIGS. 20(a)~20(d) show output waveform diagrams for each of the circuit elements of the microwave detector according to the fifth embodiment of the present invention in the case where a detection target microwave signal is received.

DETAILED DESCRIPTION OF THE PREFERRED EMBODIMENTS

Figure 1:
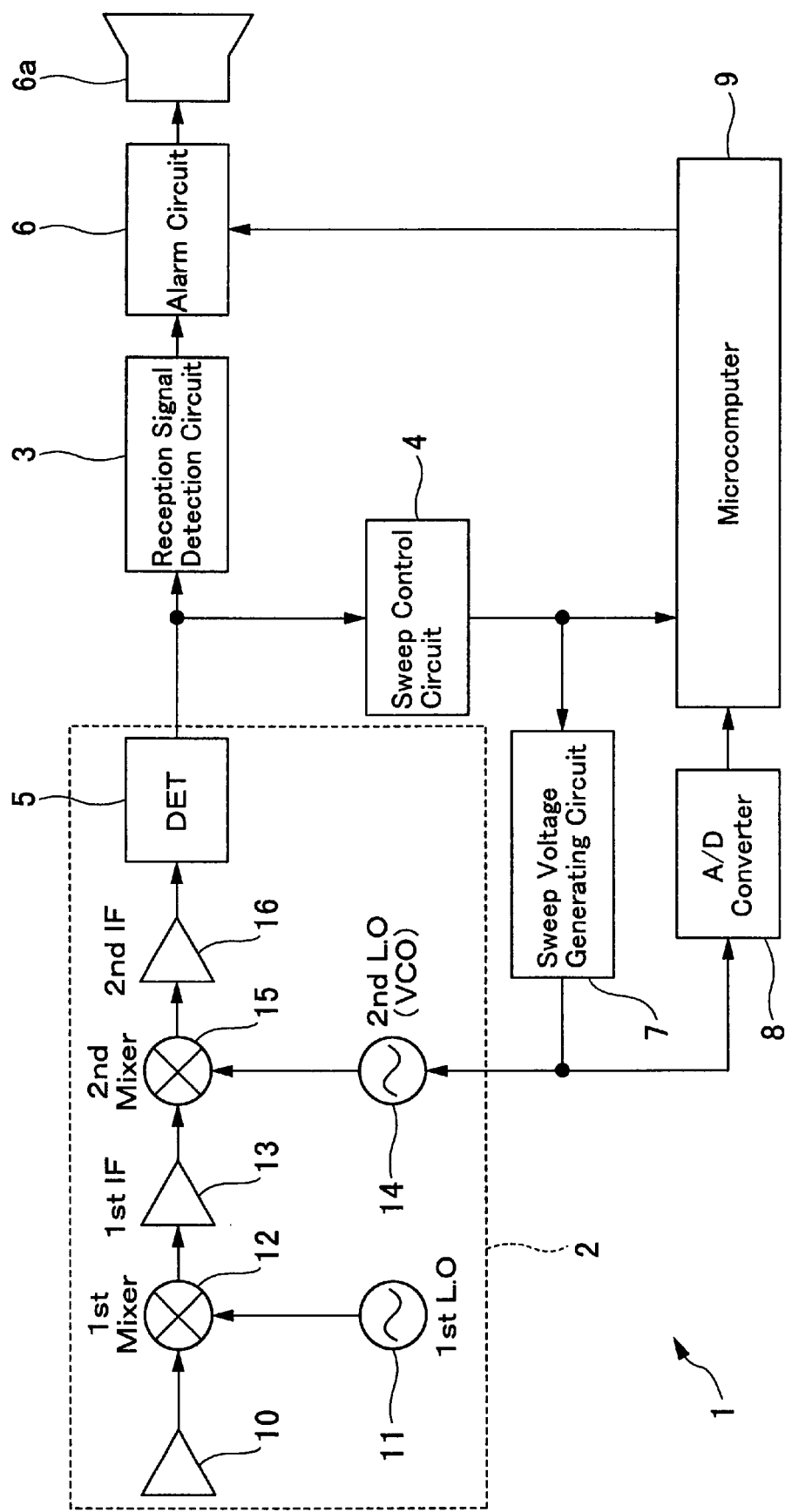
FIG. 1 is a block circuit diagram showing the overall structure of a microwave detector according to a first embodiment of the present invention.

A first embodiment of a microwave detector according to the present invention will now be described. Namely, as shown in the block diagram of FIG. 1, a microwave detector 1 is equipped with a reception portion 2 for receiving microwave signals, and based on the signals outputted from this reception portion 2, the various elements connected to the reception portion 2 in the following portions of the circuit are used in judging whether or not a detection target microwave signal has been received.

First, it should be noted that the reception portion 2 has a double heterodyne structure. Namely, microwave signals picked up by a horn antenna 10 form reception signals which undergo frequency mixing with the output of a first local oscillator 11 in a first mixer 12. The output of this first mixer 12 is inputted into a first intermediate frequency circuit 13 which is designed to extract and amplify a prescribed intermediate frequency. Then, the output of this first intermediate frequency circuit 13 undergoes frequency mixing with the output of a second local oscillator 14 in a second mixer 15. Next, the output of the second mixer 15 is inputted into a second intermediate frequency circuit 16 which is designed to extract and amplify a prescribed intermediate frequency. In this connection, the first intermediate frequency circuit 13 and the second intermediate frequency circuit 16 are both constructed from a bandpass filter, an amplifier and the like.

Further, the output of the second intermediate frequency circuit 16 is sent to a wave detector 5, and in the case where a signal having a prescribed frequency is received, the wave detector 5 is designed to detect and output such signal. Namely, the prescribed frequency at which the wave detector 5 carries out detection is set to match the frequency of the signals outputted by the second intermediate frequency circuit 16 when a detection target microwave signal is received.

Accordingly, when a detection target microwave signal is received, the output of the wave detector 5 becomes larger (i.e., a detected wave signal is outputted). Further, when no detection target microwave signals are received, the wave detector outputs noise which undergoes minor fluctuations.

Further, the second local oscillator 14 is constructed from a voltage controlled variable frequency oscillator (VCO), and the oscillation frequency thereof corresponds to the sweep voltage applied by a sweep voltage generating circuit 7. Now, as will be described later, the sweep voltage outputted from the sweep voltage generating circuit 7 repeatedly sweeps through a prescribed voltage range. Accordingly, the oscillation frequency of the second local oscillator 14 also repeatedly sweeps through a prescribed frequency range, and if a microwave signal is received within such sweep range, the wave detector 5 outputs a detected wave signal.

Now, in the present embodiment, the first local oscillator 11 will be described as having a fixed oscillation, but it is also possible to have the first local oscillator 11 perform a sweeping operation while fixing the oscillation frequency of the output of the second local oscillator 14. Further, because the basic structure of the reception portion 2 described above is similar to that used in prior art microwave detectors, a detailed description of the processing circuits and related elements will be omitted.

With regards to the reception portion 2, the output thereof is sent to a reception signal detection circuit 3 and a sweep control circuit 4. The reception signal detection circuit 3 monitors the output of the wave detector 5 in the reception portion 2 and discriminates whether or not a reception signal having a prescribed frequency microwave signal is present in the output of the wave detector 5. For example, the reception signal detection circuit 3 can be constructed from a comparator, and by appropriately controlling the threshold value used for comparison with the output of the wave detector 5, it is possible to output a pulse (e.g., the output can be switched from Low to High) when the output of the wave detector 5 reaches or exceeds the threshold value, whereby it becomes possible to judge that a prescribed frequency microwave signal has been detected. In this regard, in the same manner as is carried out in prior art microwave detectors, the threshold value established in the reception signal detection circuit 3 is set at an appropriate value to enable the output level of the wave detector 5 in the case where a detection target microwave signal is received to be discriminated from the output level of the wave detector 5 where no detection target microwave signals are received. In other words, in order to reliably discriminate the microwave signals that one wishes to detect, a threshold value is established to enable detection of a detection target microwave signal having a high enough signal level, with detection target microwave signals not having a high enough signal level going undetected.

Further, the pulse output (i.e., a detection signal) from the reception signal detection circuit 3 is sent to the alarm circuit 6. As will be described below, the alarm circuit 6 also receives a detection signal sent from a microcomputer 9, and based on either this detection signal from the microcomputer 9 or the pulse output from the reception signal detection circuit 3, the alarm circuit 6 sounds a buzzer 6a.

In other words, when at least one of the reception signal detection circuit 3 and the microcomputer 9 sends a detection signal to the alarm circuit 6, the buzzer 6a will be sounded based on such detection signal. In this regard, the microcomputer 9 is provided with a function (described in detail below) to detect faint microwave signals that are difficult or impossible to detect with the reception signal detection circuit 3 due to low reception levels, and upon detecting such faint microwave signals, the microcomputer 9 is designed to output a detection signal.

In this way, as is carried out in prior art microwave detectors, when a microwave signal above a prescribed level is received, it is possible to output an alarm based on a detection signal from the reception signal detection circuit 3. Further, in the case where a faint microwave signal is received, if such faint microwave signal is a detection target microwave signal, an alarm will be outputted based on the detection signal from the microcomputer 9, and this makes it possible to output an alarm when faint detection target microwave signals are received.

Next, a detailed description will be given for the structure of the essential portion of the present invention which carries out detection of even faint microwave signals. First, the sweep control circuit 4 digitally processes the output of the wave detector 5, and in the case where the voltage outputted by the wave detector 5 reaches or exceeds a prescribed reference level, the sweep control circuit 4 will have a High output level. In particular, because the detected wave output of the wave detector 5 will contain noise even when no microwave signals are received, the central value of such noise is digitally processed and established as the reference level.

Accordingly, during the state in which no detection target microwave signals are received, the random fluctuating output level of the noise will cause the noise level to frequently shift between a state in which the noise level reaches or exceeds the prescribed reference level and a state in which the noise level lies below the reference level. As a result, the output of the sweep control circuit 4 forms a repeating H/L pulse train. Further, the random nature of the noise will also cause fluctuations in the pulse width of each pulse. However, by establishing the central value of the noise as the reference level, if a single complete sweep interval is examined, the time intervals in which the noise level reached or exceeded the reference level resulting in a High output and the time intervals in which the noise level was below the reference level resulting in a Low output will both average out to roughly the same amount of time. Accordingly, the duty of the pulse train outputted from the sweep control circuit 4 can be considered to be ½.

Further, the output of the sweep control circuit 4 is sent to the sweep voltage generating circuit 7 and the microcomputer 9. In the present embodiment, the sweep voltage generating circuit 7 performs a sweep stop when the output of the sweep control circuit 4 is High, and lowers the sweep voltage when such output is Low. Then, if the output reaches a preset termination voltage value (lowest value), the sweep voltage generating circuit 7 will return to the sweep start voltage (maximum value), and the process described above will be repeated.

Figure 2:
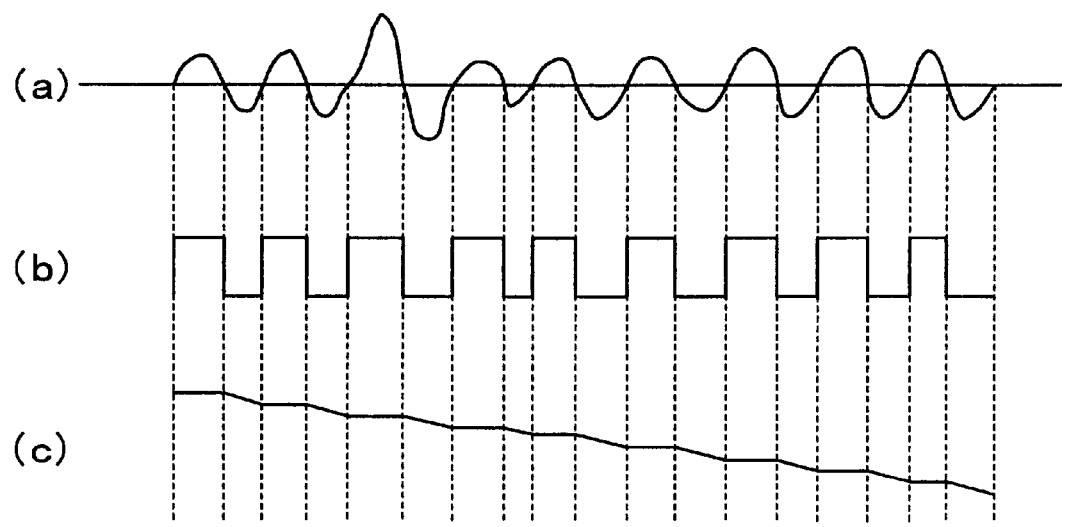
FIG. 2(a) is a waveform diagram showing one example of the output of the reception portion during the time when no detection target microwave signals are received by the microwave detector according to the first embodiment of the present invention.
FIG. 2(b) is a waveform diagram showing one example of the output of the sweep control circuit during the time when no detection target microwave signals are received by the microwave detector according to the first embodiment of the present invention.
FIG. 2(c) is a waveform diagram showing one example of the change in the sweep voltage during the time when no detection target microwave signals are received by the microwave detector according to the first embodiment of the present invention.

Accordingly, for the example shown in FIG. 2, if the output of the wave detector 5 during the state in which no detection target microwave signals are received is shown by FIG. 2(a), the output of the sweep control circuit 4 will form the pulse train shown in FIG. 2(b). In this regard, if the entire interval of one complete sweep is examined, the duty of the pulse train outputted from the sweep control circuit 4 is found to be ½.

Figure 3:
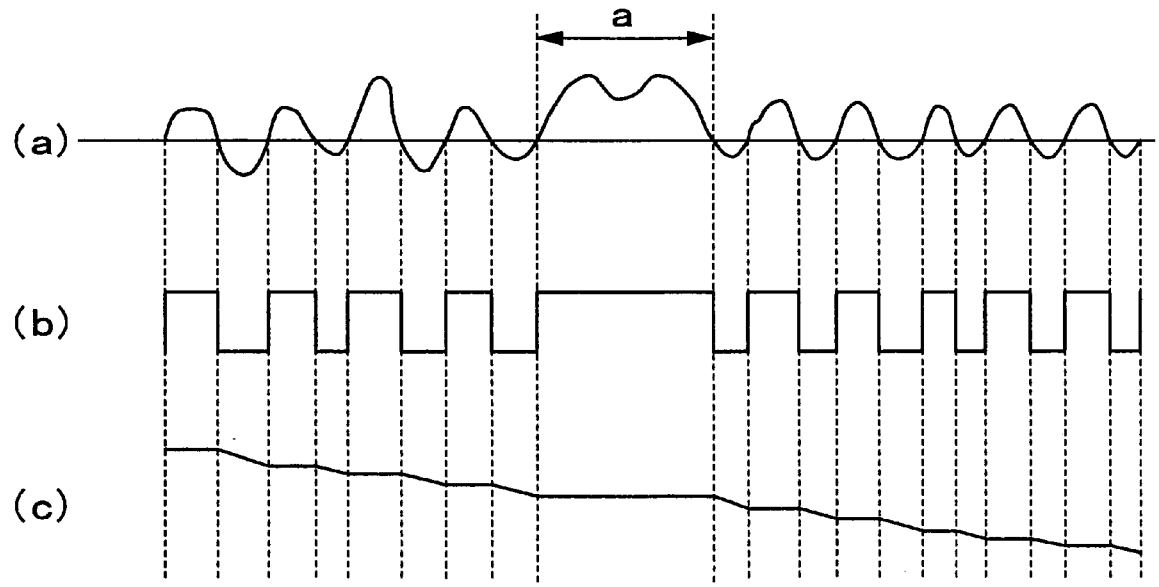
FIG. 3(a) is a waveform diagram showing one example of the output of the reception portion during the time when a detection target microwave signal is received by the microwave detector according to the first embodiment of the present invention.
FIG. 3(b) is a waveform diagram showing one example of the output of the sweep control circuit during the time when a detection target microwave signal is received by the microwave detector according to the first embodiment of the present invention.
FIG. 3(c) is a waveform diagram showing one example of the change in the sweep voltage during the time when a detection target microwave signal is received by the microwave detector according to the first embodiment of the present invention.

On the other hand, in the case where a detection target microwave signal is received, such as in the example shown in FIG. 3, because the output level of the wave detector 5 will basically reach or exceed the reference level over the interval in which the detection target microwave signal was received (see interval "a" in FIG. 3), the High level intervals of the digital output of the sweep control circuit 4 will be longer than the Low level intervals thereof.

In either case, due to the repeated switching between High and Low outputs having different pulse widths, the sweep voltage gradually decreases, as shown in FIGS. 2(c) and 3(c), and based on this, the second local oscillator 14 repeatedly sweeps a prescribed frequency range.

Further, in addition to supplying this sweep voltage to the second local oscillator 14, the voltage value of such sweep voltage of the sweep voltage generating circuit 7 is inputted into the microcomputer 9 via the A/D converter 8.

Now, based on the High/Low output (H/L output) sent from the sweep control circuit 4 and the voltage value (digital value) of the sweep voltage outputted from the sweep voltage generating circuit 7, the microcomputer 9 uses the principles discussed below to judge whether or not a microwave signal has been received, and in the case where a microwave signal is judged to have been received, a detection signal is outputted to the alarm circuit 6. In this regard, the detection principle used by the microcomputer 9 makes it possible to detect even faint detection target microwave signals which can not be detected by the reception signal detection circuit 3.

Namely, in the state in which no detection target microwave signals are received, because the wave detector 5 outputs signals generated by the random noise of the receiver, a High signal will be outputted during the intervals in which the receiver noise reaches or exceeds the reference level established by the comparator of the sweep control circuit 4, as shown in FIG. 2(b), but the total time of such High level outputs during one sweep cycle will be roughly the same as the total time of the Low level outputs.

On the other hand, when a detection target microwave signal is received, such as in the case shown in FIG. 3(a), because the signal level will continuously reach or exceed the reference level established in the sweep control circuit 4 over the reception interval (interval "a") of the received signal, a High signal will be outputted over such time interval. Consequently, the pulse width of the High signal pulse over the continuous interval "a" will be longer than the High signal pulse widths normally generated by noise. Further, if the amount of voltage lowering per unit time is fixed for the voltage lowering operations carried out during Low signal outputs, the total time required for lowering the voltage can be considered fixed during each sweep cycle.

Accordingly, based on the sweep voltage, the sweep start voltage and the sweep termination voltage can be used to specify the sweep interval for a single sweep, and by measuring the total time sweep stops are carried out over such sweep time interval, namely, by measuring the total time (i.e., the integrated time) High signals are outputted by the sweep control circuit 4 over such sweep interval, it becomes possible to make the judgement that a detection target microwave signal has been received in the case where the total time of the High signals reaches or exceeds a prescribed amount of time. In this connection, the microcomputer 9 is provided with a function for carrying out such judgement process. Namely, if the total time High signals are outputted during the sweep time interval for the case where no microwave signals are received and only noise is present is established as a reference total time, microwave signals can be judged to have been received in the case where the actual measured total time reaches or exceeds such reference total time.

In actuality, it is possible to measure either the total time High signals are outputted or the total time Low signals are outputted, and then when normalization is performed by calculating the duty thereof, the amount of shift between such calculated duty and the duty of ½ for noise without received signals may be used to judge whether or not a microwave signal has been detected.

Further, quantities such as the actual duty and the like can be calculated either in a stepwise manner at the end of each sweep cycle or successively in real time. In this regard, even though a more complicated calculation process is required, the latter method is preferred because it makes it possible to quickly output an alarm when a microwave signal is received. Now, even in the case where real time monitoring is carried out, the integrated value is reset when the termination voltage is reached, and then the operations proceed to the next monitoring process.

Further, as is clear from a comparison between FIG. 2(c) and FIG. 3(c), the sweep time interval required for the completion of a single sweep is longer for the case where a detection target microwave signal is received than for the case where no detection target microwave signals are received. Accordingly, by measuring the sweep time of each sweep cycle, it is also possible to make the judgement that a detection target microwave signal has been received in the case where an actual sweep time measurement is longer than a prescribed reference sweep time established based on the sweep time required for the case where only noise is present.

In this connection, in each of the examples described above, the actual calculations of time may be carried out using a timing means such as a timer or the like, or using an integrating circuit equipped with a CR.

Figure 4:
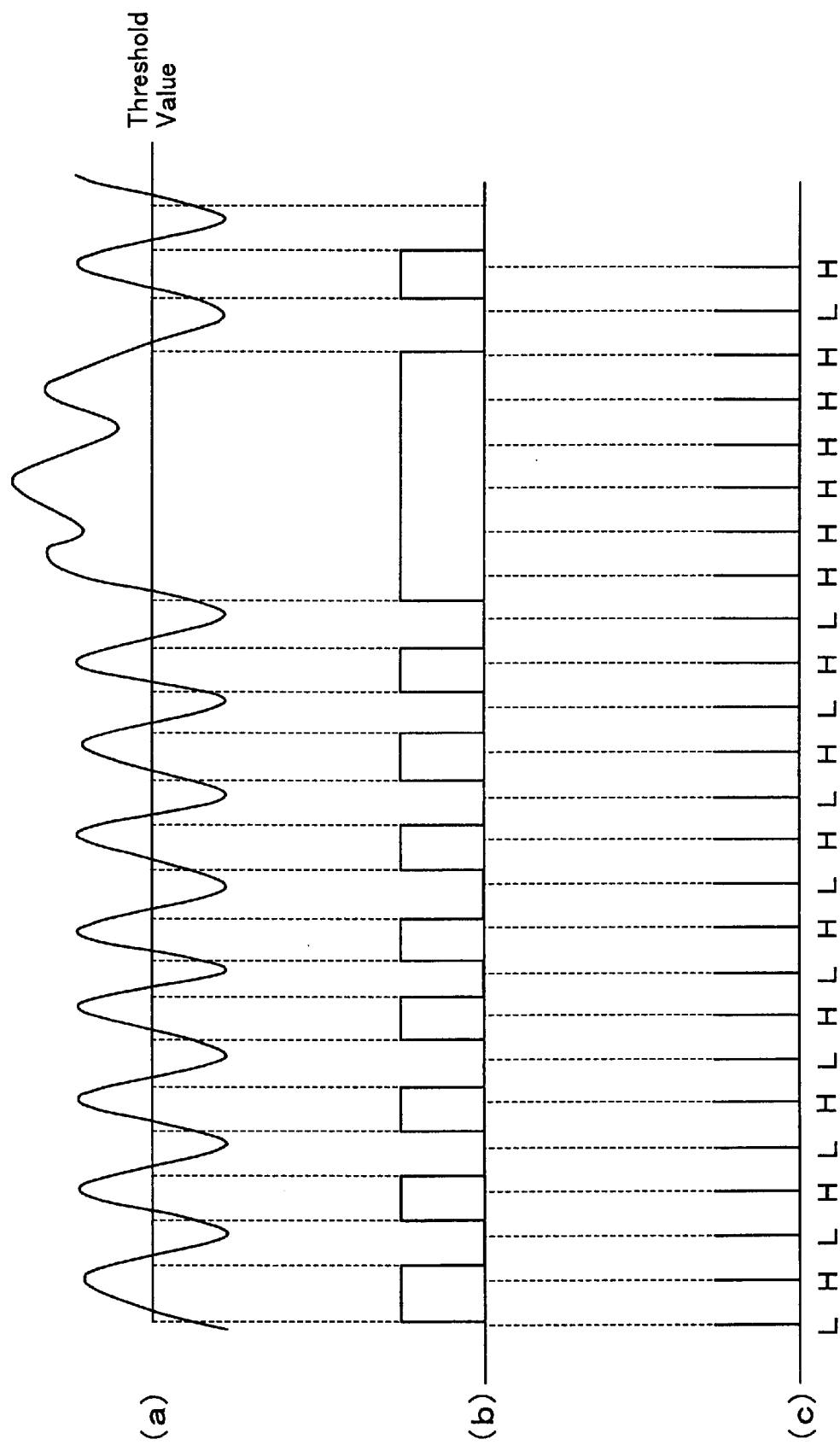
FIG. 4(a) is a waveform diagram showing another example of the output of the reception portion during the time when a detection target microwave signal is received by the microwave detector according to the first embodiment of the present invention.
FIG. 4(b) is a waveform diagram showing another example of the output of the sweep control circuit during the time when a detection target microwave signal is received by the microwave detector according to the first embodiment of the present invention.
FIG. 4(c) is a waveform diagram showing one example of timing intervals in which signals are sampled for input into a microcomputer in the microwave detector according to the first embodiment of the present invention.

Moreover, as shown in FIG. 4, instead of integrating the actual times, the microcomputer 9 can acquire the H/L signals by carrying out a sampling operation over a prescribed cycle on the digital signals (see FIG. 4(b)) outputted from the sweep control circuit 4 based on the wave detector output (see FIG. 4(a)). In other words, the data (i.e., the H/L signals) inputted into the microcomputer 9 (which forms the judgement means) is carried out for a prescribed sampling time interval. Then, the judgement that a detection target microwave signal has been received may be made in the case where the number of High signals occurring over a single sweep interval is greater than or equal to a prescribed reference number established based on the number of High signals outputted in the case where only noise is present.

Further, in this case, both the number of High signals and the number of Low signals may be counted to calculate the duty thereof, and then based on such calculated duty, a judgement of whether a microwave signal is present or absent may be carried out. Further, if the circuit structure shown in FIG. 1 is used as a base and the detected wave output of the wave detector 5 is inputted into the microcomputer 9 after undergoing A/D conversion, the microcomputer 9 can be made to judge whether or not the voltage value of the detected wave signal is greater than or equal to a prescribed reference value, and by recording the number of times such prescribed reference value is reached or exceeded, it is possible to carry out judgements based on the same principle used in the judgement process described previously above.

In this connection, the A/D conversion carried out when inputting the voltage value (corresponding to FIG. 4(a)) of the detected wave output into the microcomputer 9 may be performed by a separate A/D converter provided external to the microcomputer 9, or by an A/D converter provided as an integral part of the microcomputer 9 to make it possible for the digitalization process to be carried out inside the microcomputer 9.

Further, while sampling may be carried out when inputting the detected wave output into the microcomputer 9 as described above, the present invention is not limited to this arrangement, and it is also possible to arrange the sweep control circuit 4 to be provided with a digitalization process portion for carrying out a digitalization process over a prescribed sampling time interval. In other words, when carrying out a digitalization process on the output of the wave detector 5, such digitalization process can be carried out over a sampling time interval instead of being carried out continuously.

Furthermore, the sweep voltage generating circuit 7 may of course be provided with a means for forcibly releasing the sweep stop in the case where the sweep stop is applied continuously for a period of time that reaches or exceeds a prescribed time interval.

Moreover, in the present embodiment, the detection of microwave signals having a signal level above a normal prescribed level is carried out by the reception signal detection circuit 3, but even in this case, the detected wave output of such a high level normal microwave signal will cause the sweep stop interval to become longer in accordance with the same principle described previously above, whereby a detection signal will be outputted from the microcomputer 9. Accordingly, the reception signal detection circuit 3 may be removed from the structure of the microwave detector of the present embodiment.

Incidentally, in the present embodiment and the modifications thereof described above, a judgement of whether a microwave is present or absent is carried out based on data acquired over the entire interval of a single sweep. In other words, the sweep time interval forms one time division. In this connection, if the time required for a single sweep is approximately 100 msec, for example, the sweep time will have an error of approximately 5 msec due to the effects of the circuits, temperature characteristics and receiver noise. At this time, if the sweep stop time interval accompanying the reception of a detection target microwave signal is approximately 5 msec, the sweep stop time interval will become buried within the sweep time error (i.e., within the dispersion range of the sweep time over which a single sweep is carried out). However, because comparisons using the duty and the like can make detection possible even for this case, and because there will also be sweep stop time intervals longer than 5 msec at the time such microwave signals are received, operations will be performed for such case.

Figure 5:
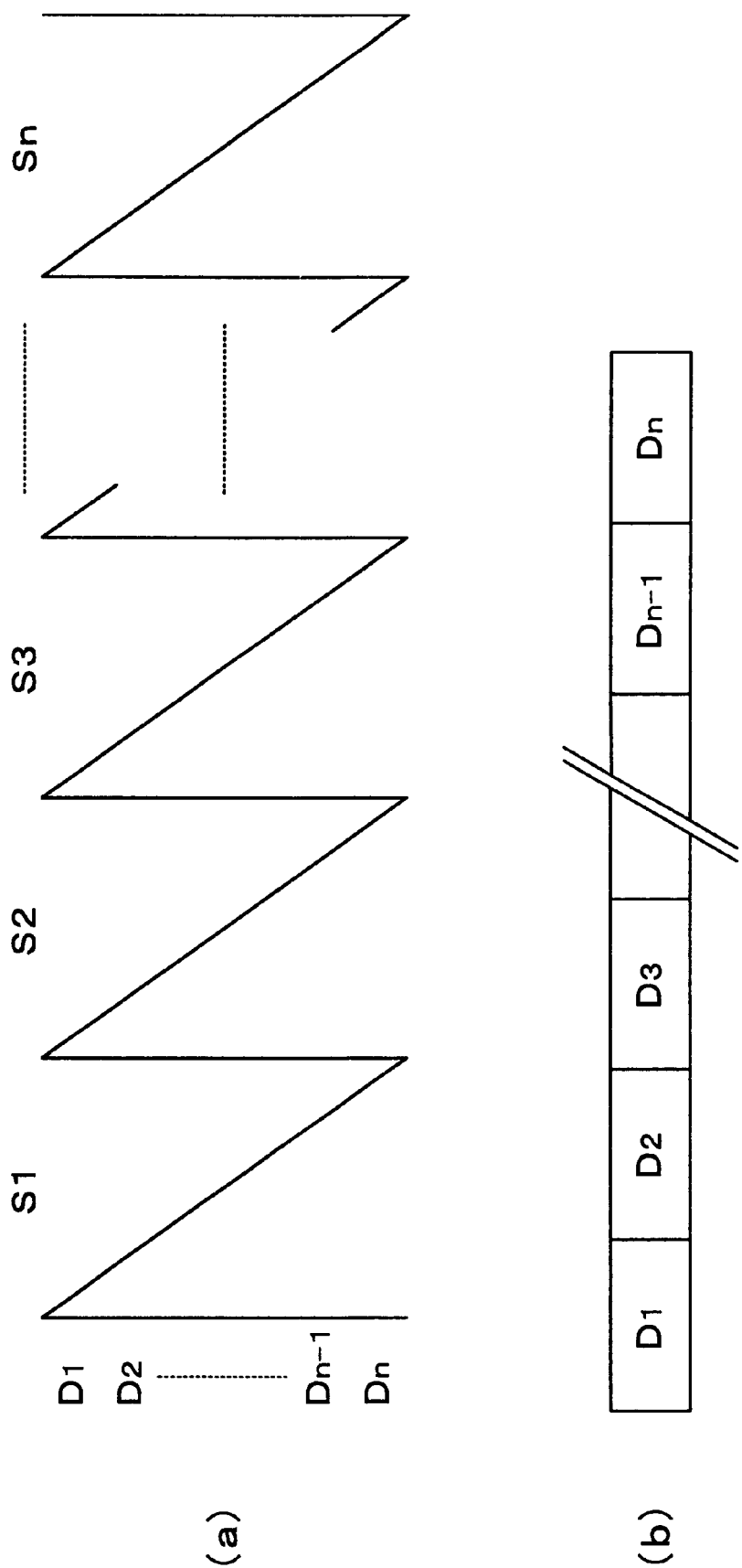
FIG. 5(a) is a diagram showing the respective memory blocks into which the data inputted into the microcomputer is written during one sweep in the microwave detector according to the first embodiment of the present invention.
FIG. 5(b) is a diagram showing the memory structure of the microcomputer in the microwave detector according to the first embodiment of the present invention.

In this connection, in a manner like the example shown in FIG. 5, the sweep range is divided into "n" divisions, and as shown in FIG. 5(b), divided memory regions are established for each divided region $D_1$ through $D_n$. In particular, the integration value of the intervals over which sweep stops are carried out (i.e., the integration value of the intervals over which the sweep control circuit 4 outputs a High signal) is stored for each respective divided region.

Namely, from the sweep voltage value, it is possible to easily determine the current divided region to which such sweep voltage belongs. Further, because the sweep voltage is gradually lowered, the integration value is reset, for example, when the sweep voltage moves into the divided region located one division below the current divided region, and then the intervals over which the sweep control circuit 4 outputs a High signal are integrated until the sweep voltage moves into the next divided region, with the integration value calculated for such divided region being stored in the corresponding divided memory region.

Accordingly, because the total time the voltage control circuit 4 outputs a High signal for each division (i.e., the division reference integration value) when no microwave signals are received and only noise is present is known, for each divided region it is possible to make the judgement that a microwave signal has been detected when the calculated division integration value is greater than or equal to the division reference integration value. Here, the term "greater than or equal to" which forms the requirement for making the judgement that a microwave signal has been detected may simply mean that the calculated division integration value is greater than or equal to the division reference integration value (i.e., with a margin of 0), or such term may mean that the calculated division integration value is greater than or equal to the division reference integration value by a prescribed margin (i.e., the calculated division integration value is greater than or equal to a prescribed amount). Further, in addition to being applicable to the embodiment and modifications described above, such judgement means may be used in the same manner in each of the embodiments described below.

In the examples presented above, because a 5 msec fluctuation for a time interval of 100 msec constitutes a 5% fluctuation quantity, if such time interval is assumed to be divided into ten divisions, a single divided region will have a time interval of approximately 10 msec with a fluctuation quantity of 0.5 msec. Accordingly, if a microwave signal is received over a time interval of about 5 msec, it will be possible to carry out a sufficient discrimination.

In this connection, although it is possible to use any number of divided regions, if the specific number of divided regions is established to match the resolution of the A/D converter, for example, it becomes possible to achieve a high efficiency. In other words, if the A/D converter 8 is an eight bit converter, then 256 divided regions can be created. Of course, the resolution and division number do not need to have a one to one correspondence.

Further, even in the case where the divided regions are established in this way, instead of carrying out the above-described integration of the High signal time intervals, it is of course possible to perform a sampling operation in which the number of times a High signal state occurs in such sampling are added up.

Furthermore, in the case where the wave detector 5 carries out wave detection of microwaves signals for a plurality of bands in a single sweep, it is possible to discriminate which band a detected microwave signal belongs to based on the sweep voltage value that reaches or exceeds a reference value.

Preferably, at the completion of each sweep, a judgement of whether the obtained results are longer or shorter than the reference time interval is carried out, with "1" being integrated into the memory when the result is longer and "0" being integrated when the result is shorter. Then, if a microwave signal is judged to be received when the integrated value reaches a value greater than or equal to a prescribed value within the completion of a prescribed number of sweeps, such judgement method makes it possible to reduce the amount of memory used and the number of write operations performed. Of course, this type of judgement can be carried out for each memory block divided from the memory for each sweep voltage.

In addition to the modifications described above, it is possible to judge whether or not a detection target microwave signal has been received by comparing the length of time required to complete a single sweep with a separately established reference sweep time. Further, by considering the total time of a plurality of sweeps in a manner similar to that carried out for the embodiment and modifications described above, the error of each sweep interval can be reduced to improve the detection accuracy in this modification as well.

Furthermore, in the embodiment and modifications described above, a judgement is carried out based on a single sweep, with the memory being cleared for each sweep cycle. However, the present invention is not limited to this arrangement, and it is possible to carry out a reset operation each time a prescribed plurality of sweep cycles (e.g., $S_1 \sim S_n$) is examined.

Figure 6:
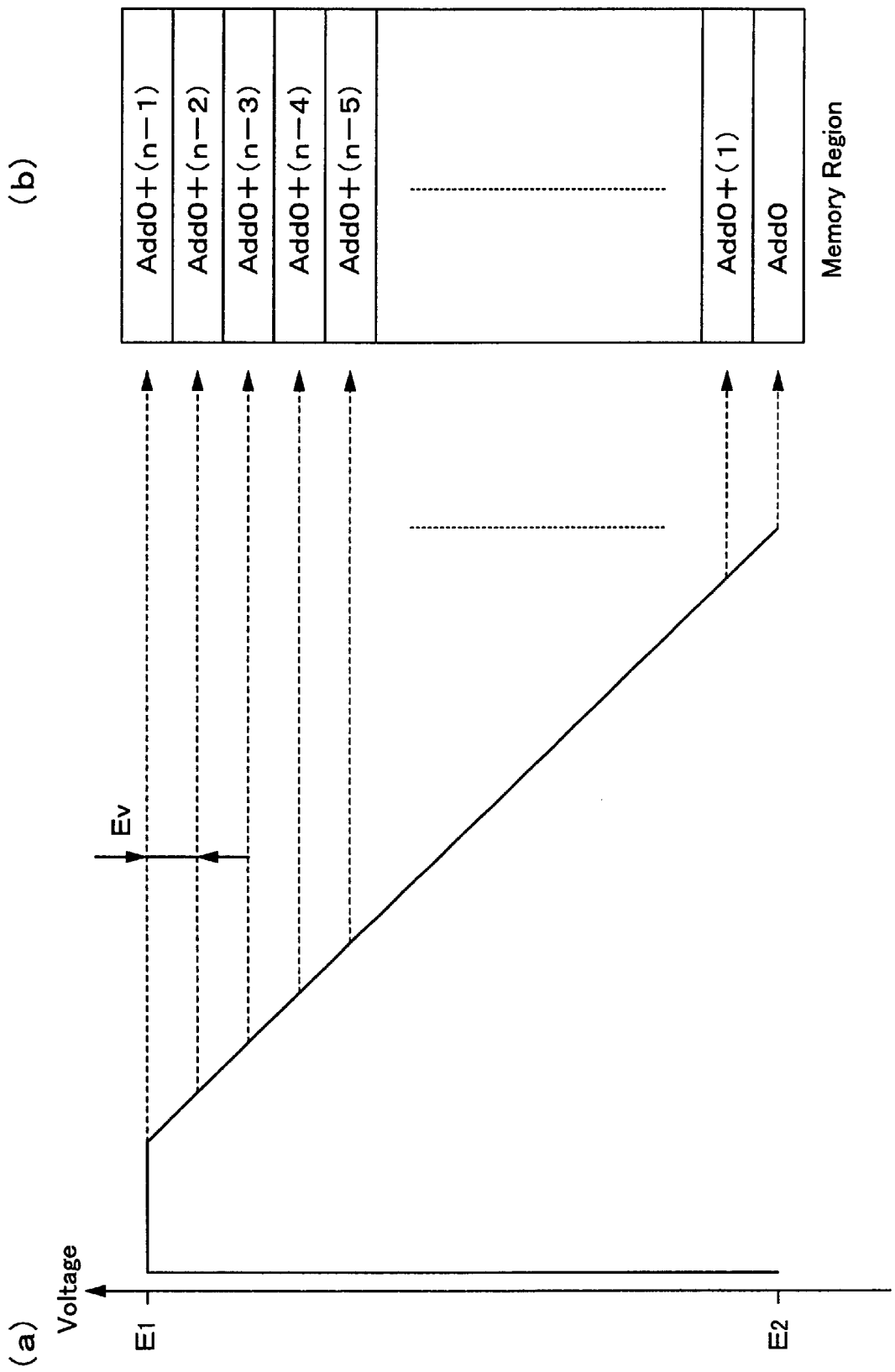
FIG. 6(a) is a waveform diagram showing one sweep carried out by the microwave detector according to the first embodiment of the present invention.
FIG. 6(b) is a diagram used for explaining the correspondence between the memory regions and the detection results obtained for one sweep in the microwave detector according to the first embodiment of the present invention.

Namely, for a single sweep, the memory 16 of the microcomputer 9 prepares "n" memory blocks which match the resolution of the A/D converter 8, as shown by FIG. 6(b). At this time, if Add0 is made the head address of the memory 16, and if the data (i.e., the voltage value) sampled by the A/D converter 8 is added as an offset to the head address, then as shown in FIGS. 6(a) and 6(b), the value obtained thereby will form the memory address accessed at such time. Accordingly, by changing the head address for each sweep cycle, it is possible to store the detection state for a number of cycle portions. Further, as an initialization step before beginning a sweep, the microcomputer 9 clears (i.e., stores 0 in) the memory region that stores data from the current sweep.

Now, with regards to the data that is stored in each memory address, it is possible to store the High signal integration time in the memory block corresponding to the sweep voltage value outputted by the A/D converter 8 at such time, or in the case where the output of the sweep control circuit 4 is sampled, the number of samplings in which a High signal was present may be stored for each sweep voltage value.

Figure 7:
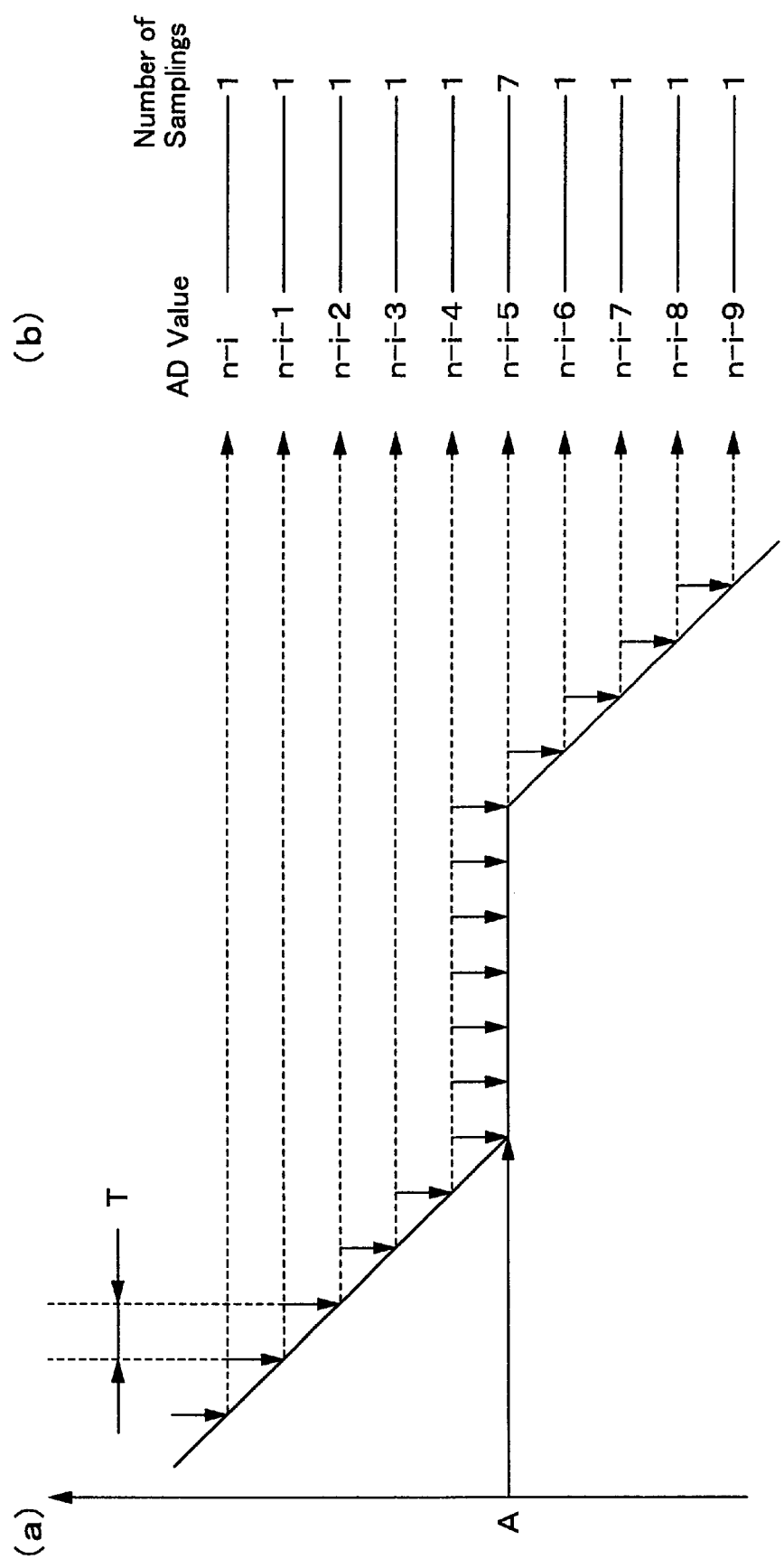
FIG. 7(a) is a diagram showing the sampling intervals over which received microwave signals are inputted into the microcomputer in the microwave detector according to the first embodiment of the present invention.
FIG. 7(b) is a diagram used in explaining the type of data stored in the memory of the microwave detector according to the first embodiment of the present invention.

In the case where the number of samplings are stored, this can be carried out easily using the procedure discussed below. Namely, if a sweep is restarted after a sweep stop has been applied over a prescribed time interval, the sweep voltage (i.e., the signal sent to the A/D converter 8) will change in a manner like that shown by the simple illustration of FIG. 7(a). In this regard, even though the actual sweep stop is carried out in a delicate manner, slanted lines are shown for convenience sake in presenting a description. Further, at the beginning of each subsequent sampling time, the sweep voltage is lowered to the region one step below the current region.

Then, in the microcomputer 9, "1" is added to memory region in the head address where the data thereof has been offset. Accordingly, for the example shown in the drawings, when the resolution of the A/D converter 8 is lowered incrementally (i.e., by units of 1) for each sampling interval during a sweep, based on the data (AD value) of the sweeping A/D converter 8 for the intervals "n–i" through "n–i–4", the integer "1" (which represents the number of samplings) will be stored in the corresponding memory region "Address: Add0+(n–i) through Add0+(n–i–4")".

In a similar manner, based on the data (AD value) of the sweeping A/D converter 8 for the intervals "n–i–6" through "n–i–9", the integer "1" (which represents the number of samplings) will be stored in the corresponding memory region "Address: Add0+(n–i–6) through Add0+(n–i–9")".

In contrast with these two regions, because a sweep stop associated with the reception of a microwave signal is carried out for the AD value "n–i–5", an incremental counting of the number of samplings is carried out, and as a result, the integer "7" is stored in the corresponding memory region "Address: Add0+(n–i–5)".

Accordingly, as shown in FIG. 7(b), a data table of the number of samplings for each AD value is stored in the memory 16. In this connection, the microcomputer 9 uses this data table to calculate the sweep stop time in each address. In other words, by multiplying the number of samplings by the sampling time interval T, it is possible to calculate the AD value corresponding to such signal and the integration time as well.

Next, when the sweep is repeated, each piece of data obtained thereby is added to the memory regions corresponding to the sweep voltage values thereof. For example, if a second sweep produces the same results as those shown in FIG. 7, when the new data is stored in the memory 16, the integer "2" will be stored as the number of samplings in the memory regions corresponding to the intervals "n–i" through "n –i–4" and "n–i–6" through "n–i–9", and the integer "14" will be stored as the number of samplings in the memory region corresponding to the intervals "n–i–5".

Figure 8:
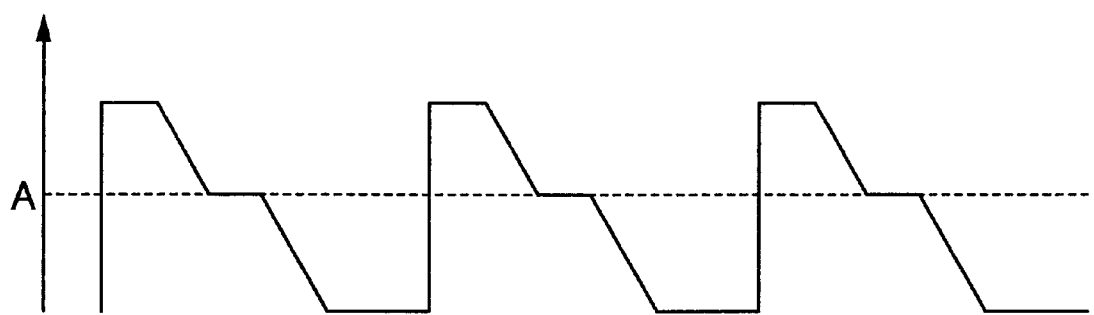
FIG. 8 is a waveform diagram showing the change in the sweep voltage when a detection target microwave signal is detected by the microwave detector according to the first embodiment of the present invention.

In this way, based on the plurality of sweeps carried out, the judgement that a detection target microwave signal has been received can be made when the total integrated time stored in each memory region is greater than or equal to a prescribed value. Namely, as shown in FIG. 8, in the case where a detection target microwave signal is received, even if the time of the sweep stop generated during one sweep is short (i.e., even if the number of samplings stored in the related memory region is small), such sweep stop will continue to be generated for every sweep, and because the same microwave signal will have a fixed frequency, the AD value for such sweep stop will be the same (as shown by Point A in FIG. 8).

Figure 9:
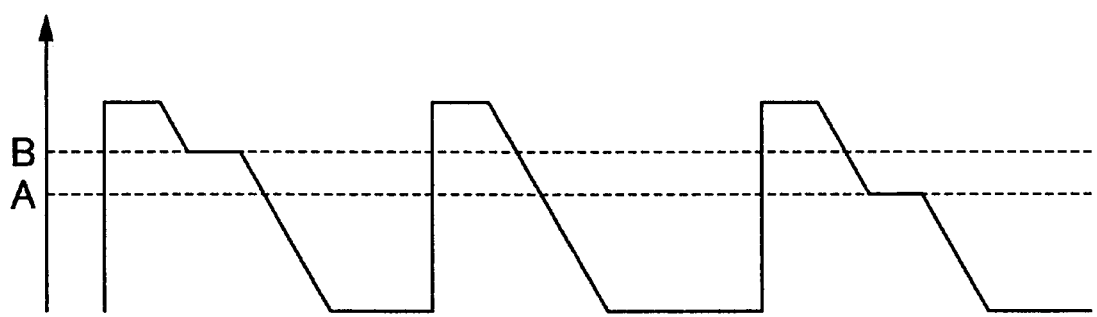
FIG. 9 is a waveform diagram showing the change in the sweep voltage when a microwave signal other than a detection target microwave signal is detected by the microwave detector according to the first embodiment of the present invention.

On the other hand, as shown in FIG. 9, in the case where sweep stops occur due to noise or the like, such sweep stops will be generated at different AD values (e.g., at Point A and Point B in the example shown in FIG. 9), and there will be cycles in which a sweep stop is not applied for more than the prescribed interval. Of course, very short sweep stops will be generated based on noise, but the integration time over which such sweep stops occur will be extremely small for each sweep voltage value.

Accordingly, if the above-described process of storing the number of samplings for each detection voltage is repeated for a number of sweep cycles, then in the case where an actual microwave signal from a detection target is received, the number of samplings at Point A (see FIG. 8) over which a sweep stop is carried out will be larger than the number of samplings at other points.

In this connection, by using either the number of times such point appears within a plurality of sweep intervals or the sweep stop time of a point having a large number of samplings as a means for judging whether or not an actual detection target microwave signal has been received, it becomes possible to improve the reception sensitivity.

In other words, even in the case where the time (the number of samplings) over which each sweep stop is carried out does not reach an appropriate time Th (reference value), in the case where a sweep stop continues to be generated at the same point, a detection target microwave signal will be judged to have been received and an alarm will be outputted.

In order to carry out such judgment, the same memory regions in the examples described above may be used. Namely, by carrying out an integration for each memory region, the judgement that a microwave signal has been received can be made when the number of integrations (integration time) stored in each memory block reaches a prescribed reference value. Then, when a microwave signal is detected in such manner, the memory is cleared when a predetermined prescribed number of repeated sweeps has been carried out, whereupon the process proceeds to the next microwave monitoring operation.

However, the results based on a plurality of sweeps do not have to be stored in the same memory regions as described above, and it is of course possible to store the results from each sweep in different memory regions. In such case, because data related to a plurality of sweeps needs to be maintained in storage, by appropriately changing the head address, for example, to prevent the storage regions of the data related to each sweep from overlapping with each other, it becomes possible to store sweep data from a plurality of sweeps in the memory, and this makes it possible to carry out judgements based on a plurality of sweeps.

Further, the judgement that an actual microwave signal has been received may be made in the case where a sweep stop continues to occur at the same point for a prescribed number of times as described above. In addition to this, in the case where sweeps have been repeated X number of times, even when the Th value has not been reached, the judgement that an actual microwave signal has been received may be made in the case where the number of sweep stops above a prescribed time (prescribed number of samplings) is greater than or equal to a prescribed number N. In this way, detection can be carried out over a short period of time even in the case where detection is suddenly interrupted for some reason.

Furthermore, instead of using the above-described simple case where an established value is reached or exceeded, the time of the sweep stops generated during each sweep and the number of such generations can be taken into consideration, so that even in the case where the same established value has been reached or exceeded, judgements can be carried out overall from the relationship between the termination time and the number of sweep stop generations. Then, an alarm can be outputted immediately upon detection of an actual microwave signal, or in the case where a signal is considered to have a possibility of being an actual microwave signal, the judgement that such signal is an actual microwave signal will be made for the case where a sweep stop is generated at the same point during a repeat sweep. Namely, the judgement results can be used in various ways to allow confirmation and like before outputting an alarm. Moreover, various judgement algorithms can be used in carrying out the judgements described above.

Further, in the description given above, when an actual microwave signal is received, the sweep stop will be generated at the same sweep voltage, whereby the number of samplings or the integration time will be added to a certain single memory address, with the other addresses having "1" or a short time stored therein.

In actuality, however, depending on such factors as the stability of the oscillation circuit, even when an actual microwave signal is received, the sweep stop voltage will undergo a certain amount of dispersion, and as a result such voltage value will not be strictly fixed. Accordingly, if the resolution of the A/D converter is increased to a level greater than that required for the stability of the circuit, the "dispersion" which accompanies such stability will unfortunately be discriminated as a different voltage. Further, even in the case where the assumption can be made that there are no unstable elements and the sweep stop voltage is fixed, if the sweep voltage overlaps with the threshold value of the A/D converter, such voltage will be divided into two parts, and this will cause the number of samplings to be split up.

However, even in such case, an accurate recognition can be carried out by making sure the resolution of the A/D converter is not raised more than necessary. Further, an accurate recognition can also be achieved by carrying out the process described below.

Figures 10, 11:
FIGS. 10(a) and 10(b) show data tables used in describing one modification of the microwave detector according to the first embodiment of the present invention.
FIGS. 11(a) and 11(b) show data tables used in describing another modification of the microwave detector according to the first embodiment of the present invention.

Namely, in the case where there is no dispersion, such as for the example shown in FIG. 10, when a sweep stop based on the detection of an actual microwave signal is carried out at the position "n–3" shown in FIG. 10(a), there will be ten samplings performed over the time interval in which a High signal is outputted by the sweep control circuit 4. In this regard, even though the number of samplings are recorded, it is also possible to renew the integration time. Consequently, for the reasons described above, the sweep stop voltage (i.e., the output value of the A/D converter) is split up in a manner like that shown in FIG. 10(b).

In such case, when a single sweep is completed, if the portion of the data which continues to reach or exceed a prescribed reference value ("2" in the example shown in the drawings) is detected, sweep stops based on the same microwave signal will be judged to take place within such portion, whereby the total value of the number of samplings of such continuing portion will form the number of suspensions related to the microwave signal, and the number of samplings will be rewritten.

In particular, if the results shown in FIG. 11(a) are obtained, because the AD value continues over the range "n–2"~"n–5", a total of 10 samplings will be calculated for each data portion of such range. Consequently, as shown in FIG. 11(b), as a renewal step, the calculated integer "10" will be stored as the number of samplings in the memory regions corresponding to such respective AD values.

In this way, because the "fluctuation of the sweep stop voltage" is previously incorporated into the data, in the case where a plurality of samplings are repeated, the peak obtained by the simple integration of such data will form the actual sweep stop point, whereby identification can be easily carried out.

Further, when carrying out a renewal (compensation) of the number of samplings in this way, instead of writing the total value in all the memory regions related in the manner described above, the total value may be written into just one representative memory region (e.g., in the middle memory region of the continuous series of memory regions), as shown in FIG. 12, with "1" being written into the other memory regions.

Figure 13:
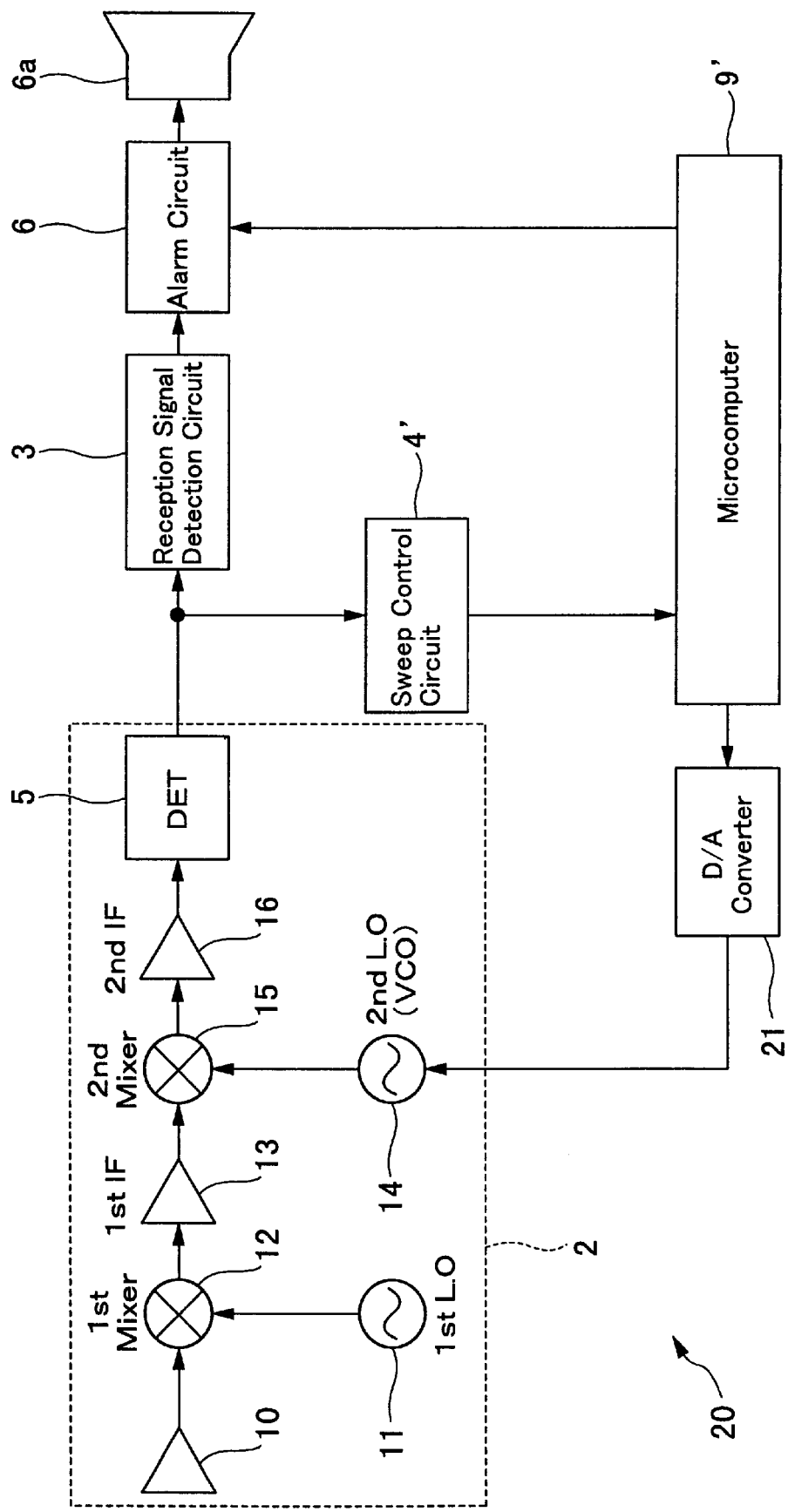
FIG. 13 is a block circuit diagram showing the overall structure of a microwave detector according to a second embodiment of the present invention.

Next, a second embodiment of a microwave detector according to the present invention will be described. First, as shown in the block diagram of FIG. 13, a microwave detector 20 according the second embodiment has a structure that is basically the same as that of the microwave detector 1 according to the first embodiment. Accordingly, the elements of the second embodiment that are the same as the elements of the first embodiment will be identified by the same reference numbers, and a detailed description of such elements will be omitted.

Now, in contrast with the first embodiment, there is no sweep voltage generating circuit 7 provided in the present embodiment. Instead, the sweep voltage supplied to the second local oscillator 14 is generated by a microcomputer 9'. Namely, the sweep voltage (digital value) generated by the microcomputer 9' is converted into an analog voltage by a D/A converter 21, and then such analog sweep voltage is sent to the second local oscillator 14. In this connection, the algorithm for generating the sweep voltage is described below.

Further, High/Low pulses are outputted from the sweep control circuit 4 based on whether the output of the wave detector 5 is above or below a reference level. In other words, in the case where no microwave signals are received, because noise is outputted from the wave detector 5, the output of the sweep control circuit 4 will repeatedly switch between High and Low levels over a short time interval. On the other hand, in the case where a microwave signal is received, the sweep control circuit 4 will continuously output a high level pulse. In this way, the sweep control circuit 4 outputs High/Low pulses in the same manner as was described above for the first embodiment.

Further, the microcomputer 9' divides one sweep into "n" steps and lowers the sweep voltage step by step when a falling output from the sweep control circuit 4 is detected as described previous above. In this way, as shown by the example in FIG. 14, the generated sweep voltage is gradually lowered. Then, after the n'th step has been carried out, the sweep process returns to the beginning. In this way, sweeps can be repeatedly carried out.

Figure 14:
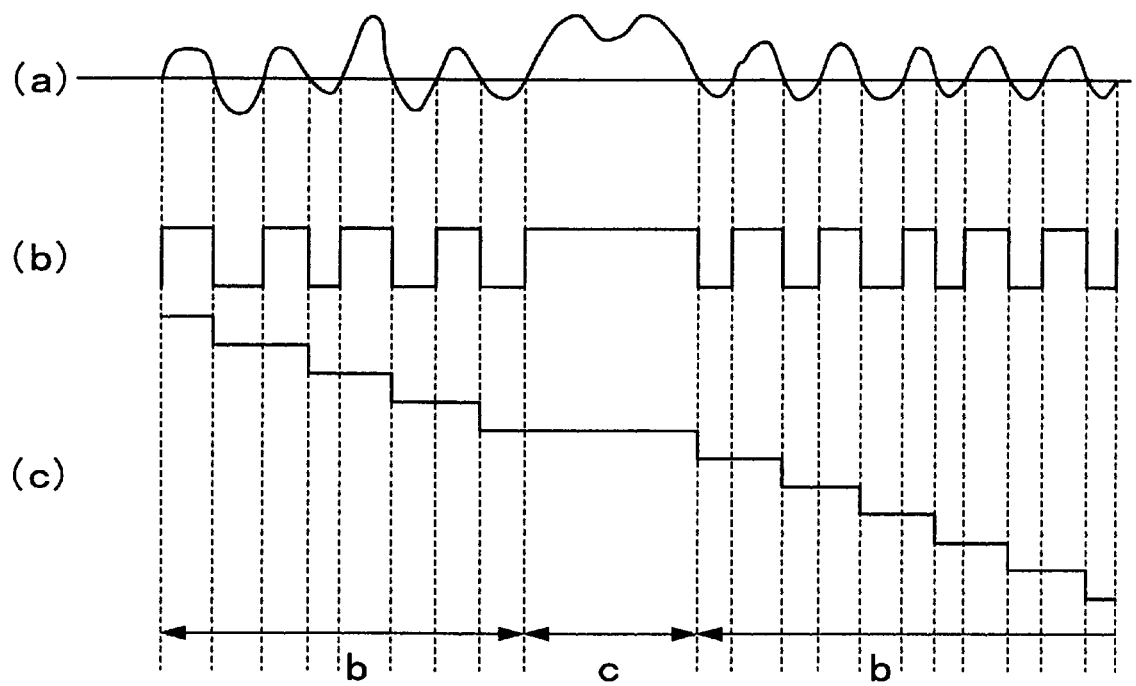
FIG. 14(a) is a waveform diagram showing one example of the output of the reception portion in the microwave detector according to the second embodiment of the present invention.
FIG. 14(b) is a waveform diagram showing one example of the output of the sweep control circuit in the microwave detector according to the second embodiment of the present invention.
FIG. 14(c) is a waveform diagram showing one example of the change in the sweep voltage in the microwave detector according to the second embodiment of the present invention.

Now, as is further shown in FIG. 14, the algorithm for detecting microwave signals in the present embodiment can utilize the difference in the amount of time the same voltage is maintained between the case where no microwave signals are received and only noise is present (e.g., the interval "b" shown in FIG. 14) and the case where a microwave signal is received (e.g., the interval "c" shown in FIG. 14). For example, by establishing a memory region corresponding to each step and calculating the time each step is maintained, the judgement that a microwave signal has been received can be made for the case where such time is greater than or equal to a prescribed value.

Further, instead of examining the length of time for each step, it is possible to calculate the total time required for a single sweep, and then the judgement that a microwave signal has been received can be made for the case where the total time is greater than or equal to a prescribed value. Of course, the measuring of time corresponding to each step may be carried out using a timer or the like, or if a prescribed time interval sampling is carried out, such measurements can be carried out utilizing the number of samplings.

Now, in the present embodiment, because the process for controlling the sweep voltage and the process for judging whether a microwave signal is present or absent are performed by a CPU, such processes are easily carried out. In this connection, because the other structural elements and operation results of the present embodiment are similar to those described above for the first embodiment, a detailed description will be omitted. Further, in this second embodiment, it is possible to make modifications similar to the modifications described above for the first embodiment.

Further, in the embodiments described above, the sweep control circuit 4 is constructed from a comparator or the like which carries out a comparison process using the average level of the noise as a threshold value, and this results in the generation of very short sweep stops irrespective of whether or not a microwave signal is received. When this type of structure is used, it becomes possible to reliably detect microwave signals even when the noise level has an overall upward or downward fluctuation.

On the other hand, because sweep stops are generated over the entire interval of the sweep regions, when divided regions are established in accordance with the embodiments described above, if the sweep stop integration times (i.e., the integration times for the regions where the sweep control circuit 4 has a High output level) are stored in memory regions corresponding respectively to such divided regions, then a prescribed integration time must be stored respectively in each memory region. Accordingly, because a memory region is required for each respective division, the memory capacity must be large, and this results in high costs.

Now, in order to reduce the memory capacity, the structure described below can be employed. First, the sweep control circuit 4 can be provided with a signal selection function to enable the sweep control circuit 4 to output a Low level pulse as much as possible for the case where the signals sent from the wave detector 5 are due to noise, and a High level pulse for the case where the signal from the wave detector 5 has a possibility of being an actual detection target microwave signal. In an arrangement such as this, when no microwave signals are received, there is a high probability that the sweep control circuit 4 will output a Low pulse, and this creates a high probability that the sweep voltage outputted from the sweep voltage generating circuit 7 or the microcomputer 9' will be lowered continuously without the occurrence of sweep stops.

Further, instead of establishing memory regions at the beginning, divided memories can be created for regions that include sweep voltage values at which signals having a possibility of being detection target microwave signals are inputted during a sweep. In this way, when the entire output from the sweep control circuit 4 is made Low in the case where the signals from the wave detector 5 are due to noise, because divided memories may be created only for those times when a microwave signal is received, it becomes possible to reduce the number of required memory regions.

In actuality, because the object of the present invention is to make it possible to detect even faint microwave signals having a signal level relatively close to the noise level, the sweep control circuit 4 outputs High pulses even for the case of noise, but because such High pulses due to noise are not generated over the entire intervals of the sweep regions, the required memory capacity can be reliably reduced.

Now, in the case where memory regions are created as described above when the output of the sweep control circuit 4 is High (i.e., when sweep stops are generated), it is possible to carry out the following processes. Namely, in the same manner as was described for each of the embodiments above, the judgement that a microwave signal has been received can be made for the case where the sweep stop integration time detected over a single sweep is greater than or equal to a prescribed reference value.

Further, in the case where judgements are made based on a plurality of sweeps, if divided memories are created over a first sweep cycle, for example, then the judgement process can be carried out during the second or higher number sweep cycle using the divided regions (sweep voltages) corresponding to the divided memory regions created during the first sweep cycle.

Further, in the case where during each sweep there are divided regions in which the output of the sweep control circuit 4 is High, the integration time or the number of samplings occurring in each respective divided region can be calculated for each sweep, and then these calculated values can be stored in memory regions corresponding to such divided regions. At this time, the data stored in the divided memories corresponding to such divided regions can record the relationship between the stored values and the number of the ordered sweep that is carried out. In this regard, such relationship may be stored in the same memory region, or by arranging a separate memory for storing the sweep number, the relationship can be obtained from such memory and the divided memories regions, or various other methods can be employed.

Namely, because divided memories are created when the output of the sweep control circuit 4 is High, the generation of the integration data stored in each divided memory region is not limited to the same sweep, and the number of sweeps for the integration data stored in each divided memory region may differ. Further, even for the same integration time, the lower the number of sweeps, the higher the possibility that a signal is a detection target microwave signal. Accordingly, a judgement of whether or not a microwave signal has been received may be carried out based on the integration data (e.g., the integration time or the number of samplings) and the number of sweeps.

Further, the judgement of whether or not a microwave signal has been received may be carried out for each divided region. In other words, the judgement of whether or not a microwave signal has been received may be carried out based on the above-described integration data stored in the divided memory regions and the number of sweeps. Then, in the case where a microwave signal is judged to have been received for any one of the divided regions, a detection signal will be outputted and a clearing operation will be carried out on at least the divided memory region corresponding to such divided region. Of course, at this time it is also possible to simultaneously clear the other memory regions as well.

Furthermore, even when the number of sweeps reaches or exceeds a prescribed number, in the case where the integration data does not satisfy a prescribed reference value, there is a high possibility that the output of the sweep control circuit 4 will be High due to noise, and for this reason the memory regions may be immediately cleared for such case. In this way, it becomes possible to reduce wasted memory and thereby eliminate the adverse effects such wasted memory might have on any later detection judgements.

Figure 15:
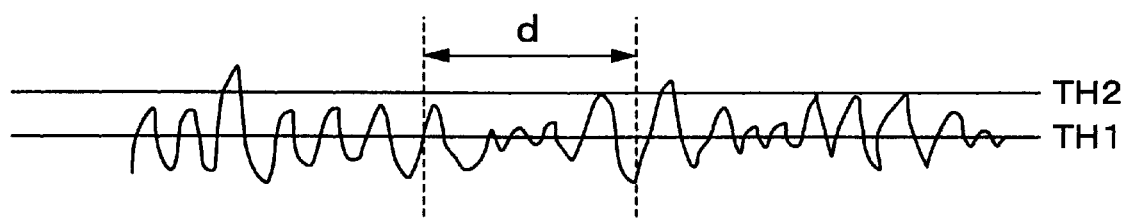
FIG. 15 is a waveform diagram used in describing one modification of the microwave detector according to the second embodiment of the present invention.

Now, as one example of a way to construct an actual signal selection function, by raising the threshold value used by the comparator for digitizing detected wave signals, it becomes possible to reduce the effects caused by the reception noise. Further, the sweep control circuit 4 can be arranged to carry out a High level output only when the pulse width obtained by the digitalization process reaches or exceeds a prescribed width. Of course, both of these functions can be simultaneously incorporated into the sweep control circuit 4. Furthermore, in the case where a high level threshold value is established, such as in the example shown in FIG. 15 where a level TH2 is established at a level somewhat higher than the average noise level TH1, there will still be large level noise portions that reach or exceed the reference level TH2. In other words, as in the prior art, the reference level is not established at or above the maximum level of the noise.

Accordingly, in the case where a reference level such as TH2 is established, if a microwave signal is received in the interval "d", the detected wave signal based on such microwave signal will overlap with the noise to form an output signal of the wave detector 5 that reaches or exceeds the reference level TH2.

Figure 16:
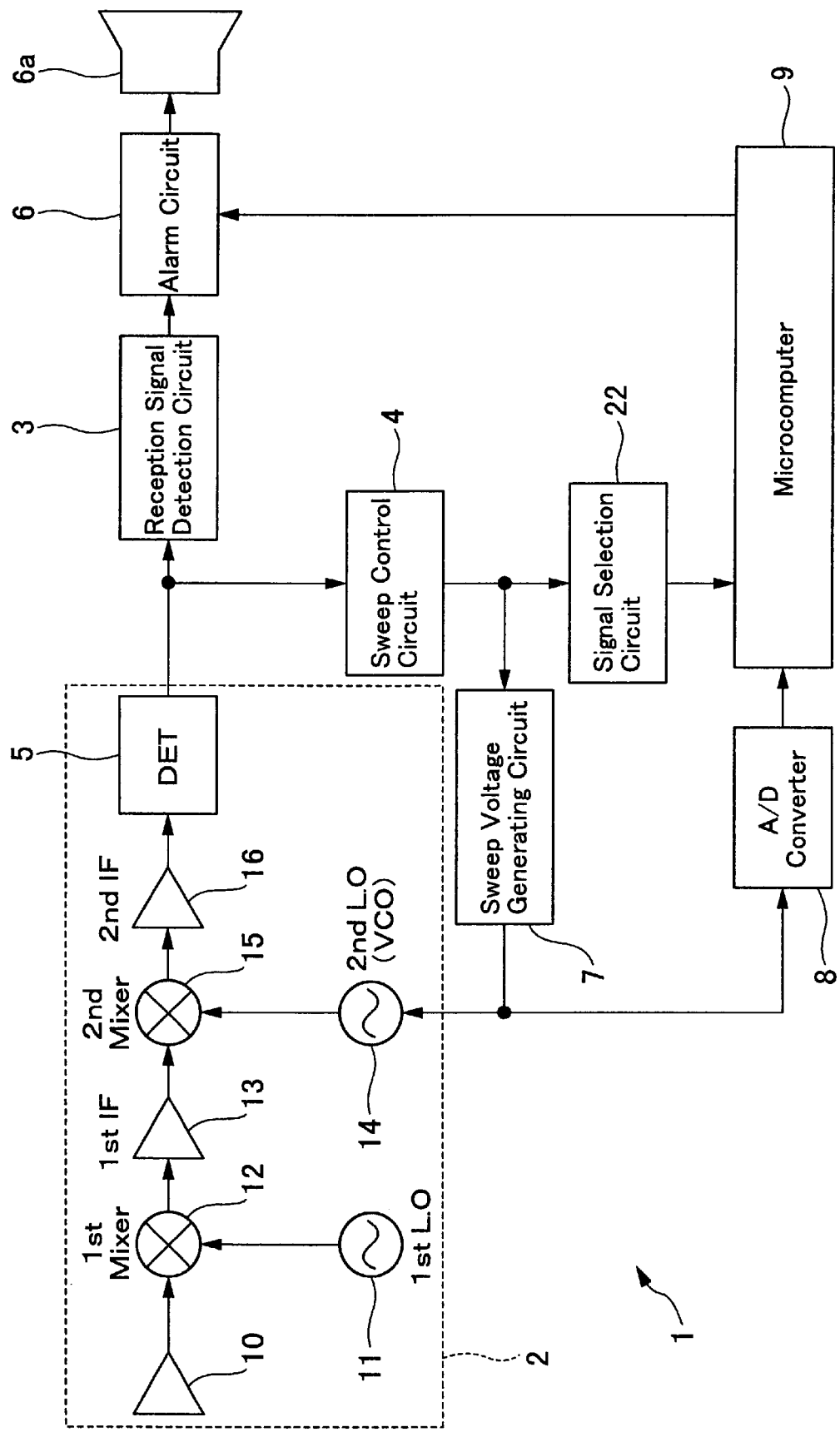
FIG. 16 is a block circuit diagram showing the overall structure of a microwave detector according to a third embodiment of the present invention.

Next, FIG. 16 shows a microwave detector according to a third embodiment of the present invention. In this connection, in each of the previous embodiments described above, the output of the sweep control circuit 4 which forms the digitizing portion is sent without alteration to the sweep voltage generating circuit 7 and the microcomputer 9 or to the microcomputer 9', and based on this same signal output, sweep operations and detection judgements are carried out. However, the present embodiment differs on these points.

Namely, the sweep control circuit 4 of the present embodiment is designed to carry out a digitalization process based on a reference level established, for example, at the average noise level or the like, with the output thereof being sent to the sweep voltage generating circuit 7, whereby sweep stops are generated over very short intervals even in the case where only noise is present. Further, in the present embodiment, a signal selection circuit 22 which serves as a discrimination means is provided between the sweep control circuit 4 and the microcomputer 9.

The signal selection circuit 22 is equipped with a function that makes it easy to discriminate whether the inputted detection wave output is probably due to noise or a detection target microwave signal. Namely, from the pulses outputted by the sweep control circuit 4, the signal selection circuit 22 is designed to pass only those pulse signals having a pulse width that is the same or longer than a prescribed reference length, with the signal pulses having pulse lengths shorter than the reference length being dropped to Low. In this respect, this function is similar to the pulse width observation method employed in the signal selecting function incorporated into the sweep control circuit 4 described in the example modifications in each of the previous embodiments described above.

Accordingly, a highly accurate judgement can be carried out by having the microcomputer 9 perform the same judgement process that is carried out in each of the embodiments and modifications described above. Further, the interval over which the output of the signal selection circuit 22 is High forms only one region of the entire sweep, and if each sweep unit is taken into account, when no microwave signals are received, it is possible that there will be no High outputs at all for an entire sweep. Accordingly, by creating memory regions and storing related integration data therein when the signal selection circuit 22 generates a High output, it becomes possible to reduce the memory capacity.

Of course, usable memory regions may also be created in advance, but in order to reduce the usable memory capacity, the storage of data therein is preferably carried out only when the output of the signal selection circuit 22 is High.

Figure 17:
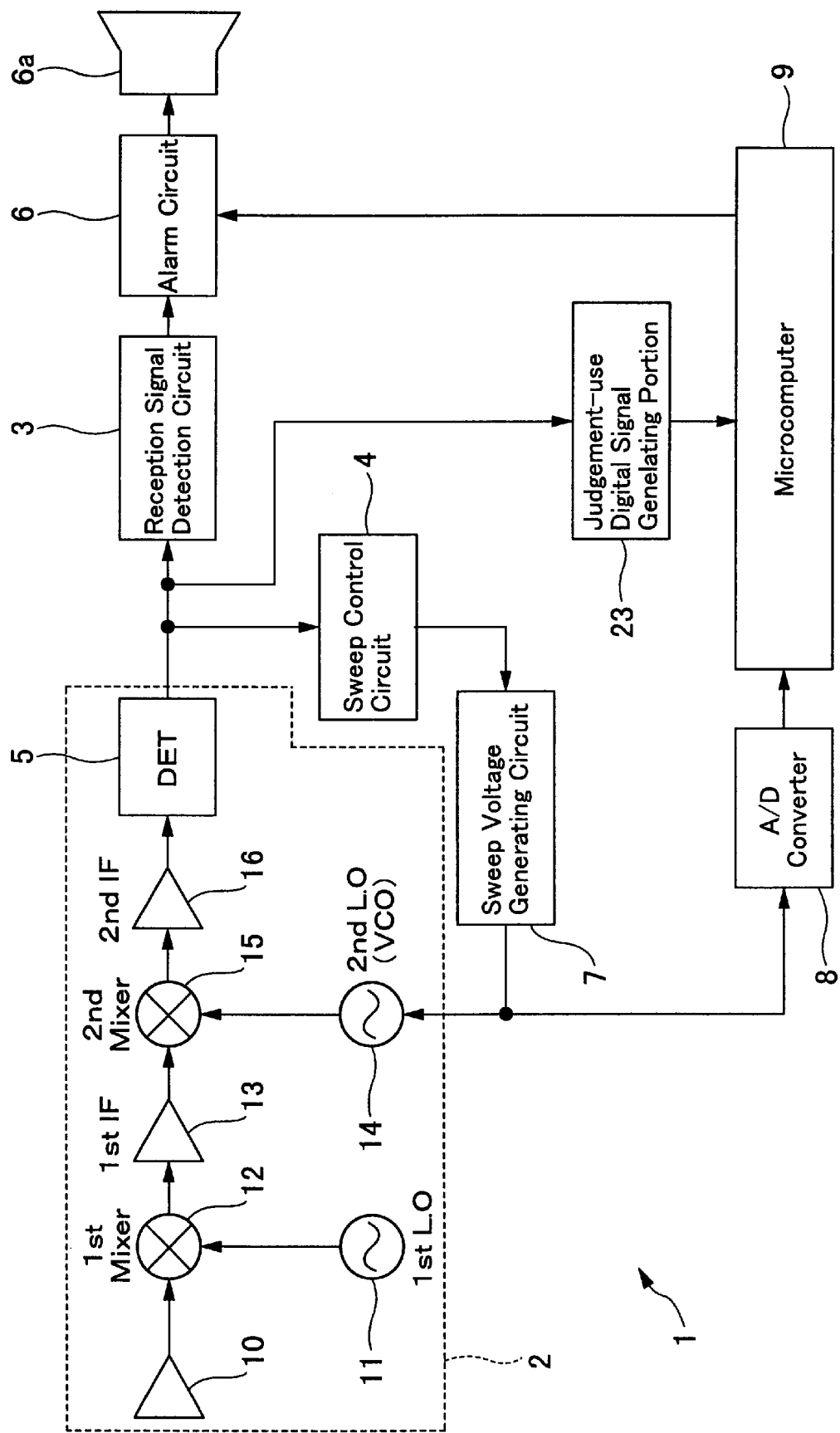
FIG. 17 is a block circuit diagram showing the overall structure of a microwave detector according to a fourth embodiment of the present invention.

Next, FIG. 17 shows a microwave detector according to a fourth embodiment of the present invention. In this connection, in each of the previous embodiments described above, sweep control and microwave signal judgments are carried out based on the output of the sweep control circuit 4. In contrast with such arrangement, in the present embodiment, sweep control and microwave signal judgements are carried out by separate systems. Namely, a judgement-use digital signal generating portion 23 which carries out a digitalization process on the output of the wave detector 5 to create judgement-use digital signals is provided separate from the sweep control circuit 4.

In this connection, the threshold value used in the judgement-use digital signal generating portion 23 may be the same as the reference level used in the sweep control portion 4 as described above, or the threshold value may be different than such reference level. In the case where the threshold value is the same as such reference level, the judgement-use digital signal generating portion 23 will utilize the same operation principles described above for the first embodiment shown in FIG. 1. Accordingly, the processes carried out in the various modifications described above can also be applied to this embodiment. For example, by processing sampling intervals, it is possible to perform a judgement operation for each divided region.

Further, in the case where the threshold value of the judgement-use digital signal generating portion 23 is different from the reference level of the sweep control circuit 4, by establishing a high threshold value, the judgement-use digital signal generating portion 23 can be equipped with a function that makes it easy to discriminate whether the inputted detection wave output is probably due to noise or a detection target microwave signal.

Now, even in the case where the threshold value of the judgement-use digital signal generating portion 23 is the same as the reference level of the sweep control circuit 4, after the judgement-use digital signal generating portion 23 has carried out a digitalization processes based such established threshold value, the pulse widths of the generated digital pulses can be monitored, whereby the judgement-use digital signal generating portion 23 can be made to carry out a High output only when a digital pulse has a pulse width longer than or equal to a prescribed width.

Furthermore, in the case where the judgement-use digital signal generating portion 23 is constructed to monitor the pulse widths after digitalization has been carried out, even though the portion which performs these operations are shown as a single processing block in the drawings, it is of course also possible to separately provided a digitalization function portion to carry out the digitalization process and a monitoring function portion to monitor the pulse widths of the digitized pulses. In other words, the judgement-use digital signal generating portion 23 provided in the present embodiment may be equipped with two separate processing blocks.

In this regard, the two processing block arrangement may also be employed in the signal selection function incorporated into the sweep control circuit 4. Further, in the case where a separate signal selection function to monitor the pulse widths is provided, such monitoring function can of course be carried out by the microcomputer 9.

Figure 18:
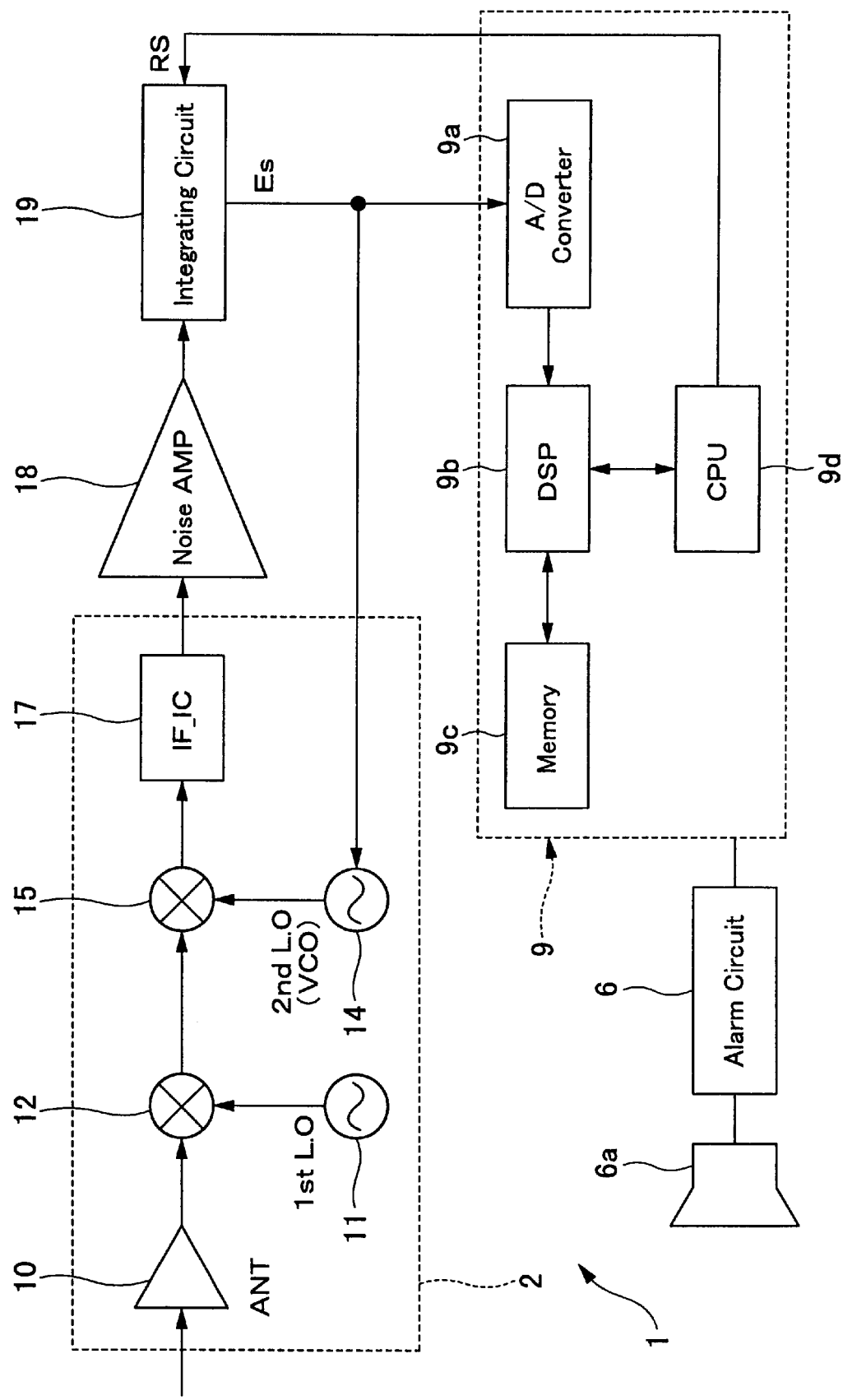
FIG. 18 is a block circuit diagram showing the overall structure of a microwave detector according to a fifth embodiment of the present invention.

Next, FIG. 18 shows a microwave detector according to a fifth embodiment of the present invention. In this embodiment, the structure which performs the function of digitizing the detected wave output is different from that of the first embodiment and modifications thereof. Namely, the present embodiment is constructed as described below.

The reception portion 2 is equipped with a horn antenna 10 for receiving microwave signals, and the reception signals received by the horn antenna undergo frequency mixing with the output of a first local oscillator 11 in a first mixer 12. Next, the output of the first mixer 12 undergoes frequency mixing with the output of a second local oscillator 14 in a second mixer 15, and then the output of the second mixer 15 is inputted into an intermediate frequency amplifier 17 which outputs only those signals belonging to a prescribed frequency band. Further, as is clear from a comparison between FIG. 1 and FIG. 18, while a first intermediate frequency circuit 13 was provided between the first mixer 12 and the second mixer 15 in the first embodiment, in the present embodiment there is no provision of such a first intermediate frequency circuit 13. Further, the intermediate frequency amplifier 17 of the present embodiment corresponds to the second intermediate frequency circuit 16 of the first embodiment. Of course, a first intermediate frequency circuit may also be provided in the present embodiment.

The output of the intermediate frequency amplifier 17 is amplified by a noise amplifier 18, and then the output from the noise amplifier 18 is sent to an integrating circuit 19. In this regard, an extremely high gain is established in the noise amplifier 18. Accordingly, in the case where no microwave signals are received, because the output of the intermediate frequency amplifier 17 forms white noise (see FIG. 19(a)), the noise amplifier 18 carries out a positive-negative full swing on such inputted white noise, whereby the noise amplifier 18 outputs a tight rectangular wave train at the frequency of the white noise (see FIG. 19(b)). Then, in accordance with a control signal (reset signal) RS outputted from the microcomputer 9, for example, the integrating circuit 19 establishes a start voltage E1 and performs a function that lowers the voltage at the time when the output of the noise amplifier 18 is Low, whereby the voltage is gradually lowered as shown in FIG. 19(c).

The output voltage Es of the integrating circuit 19 is sent as a control voltage to the second local oscillator 14 and the microcomputer 9. Then, because the second local oscillator 14 is a voltage controlled variable frequency oscillator (VCO), the frequency of the output signal is also lowered in accordance with the lowering of the control voltage Es described above. Further, if the output voltage Es of the integrating circuit 19 reaches or exceeds a prescribed voltage E2, such occurrence is detected by the microcomputer 9, and then a reset signal RS is outputted to the integrating circuit 19. In this way, a sweep can be repeatedly carried out within a prescribed frequency range (i.e., the frequency range corresponding to the voltage range from the start voltage E1 to the prescribed voltage E2).

In other words, the noise amplifier 18 makes it possible to obtain an output waveform similar to that generated for the case where the average level of the noise is established as the reference level and a digitalization process is carried out. Then, when the noise level reaches or exceeds the reference level, a sweep stop is carried out. Accordingly, the noise amplifier 18 of the present embodiment corresponds to the sweep control circuit 4 of the first embodiment. Further, the integrating circuit 19 of the present embodiment corresponds to the sweep voltage generating circuit 7 of the first embodiment.

On the other hand, in the case where an actual detection target microwave signal is received, because the output level of the intermediate frequency amplifier 17 will quickly rise to form a peak P as shown in FIG. 20(a), the noise amplifier 18 will output a pulse having a long pulse width, and as shown in FIG. 20(b), this wide pulse will have a very different appearance than the tight rectangular wave train generated at the white noise frequency prior to reception of the microwave signal. Then, because this will cause a High level signal to be continuously inputted into the integration circuit 19, the output voltage will not be lowered, and this results in the voltage being maintained at a fixed level (as shown in FIG. 20(c)). Accordingly, the frequency of the output signals from the second local oscillator 14 are also maintained at a value matching the detected frequency of the microwave signal. In other words, a sweep stop is carried out.

Accordingly, as shown in FIG. 20(a), the microwave signal is continuously detected. Now, because the output voltage Es of the integrating circuit 19 will stay fixed only for the time that the detected microwave signal continues to be present, in the case where the time interval of the fixed output voltage Es reaches or exceeds a prescribed time Th, it is possible to make the judgement that a detection target microwave signal has been detected.

Further, in the case where a sweep stop is carried out over a time interval that reaches or exceeds an appropriately prescribed time Th, if a sweep (voltage lowering) is started again and a detection target microwave signal is present, then a pair of peaks at the intermediate frequency will be outputted. Accordingly, in the case where a sweep is forcibly started again after a sweep stop has been carried out for a time interval that reaches or exceeds the prescribed time Th, it is possible to make the judgement that a detection target microwave signal has been received in case where the elapsed time from the first sweep stop to the second sweep stop lies within a prescribed reference range.

Figure 21:
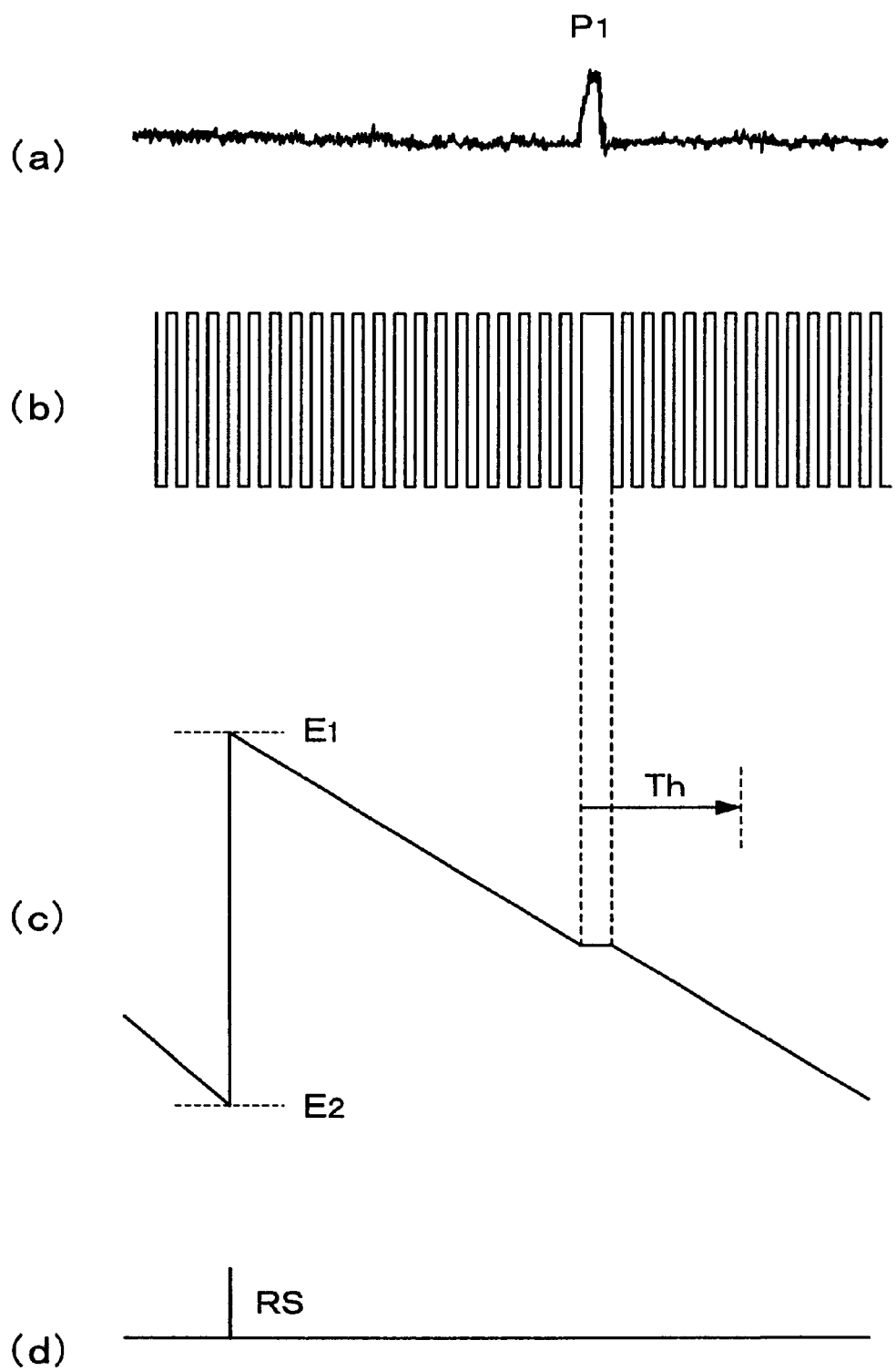
FIGS. 21(a)~21(d) show output waveform diagrams for each of the circuit elements of the microwave detector according to the fifth embodiment of the present invention in the case a microwave signal is received during the reception of noise.

On the other hand, there are cases where no detection target microwave signal is present in the received microwave signals. Namely, the received microwave signals may be due to other sources, such as automatic door sensors and the like which emit microwaves. In particular, these interference waves occur as sporadic signals. Accordingly, as shown in FIG. 21, even when a sweep stop is suddenly carried out due to the detection of the microwave signal P1, because the signal P1 quickly disappears, the output of the intermediate frequency amplifier 17 will quickly return to white noise, and the output voltage Es of the integrating circuit 19 will once again be lowered.

Further, in addition to passing through the horn antenna, various interference waves can leak into the circuits of the microwave detector 1 from the outside, but because these interference waves also occur as sporadic noise, the resulting effects thereof will be same as those described above. Namely, the sweep will be restarted when the sweep stops generated by such various types of noise occur over time intervals less than an appropriately prescribed time Th. Accordingly, by appropriately establishing a prescribed sweep stop reference time Th to discriminate whether or not an actual detection target microwave signal has been received, it becomes possible to accurately detect actual detection target microwave signals.

As described above, based on the sweep stop time interval, the judgement of whether or not a detection target microwave signal has been received is carried out by the microcomputer 9 based on the output voltage Es of the integrating circuit 19. Namely, in the microcomputer 9, the output voltage Es (analog signal) sent from the integrating circuit 19 is passed through an A/D converter 9a to undergo digital conversion. Then, the digital signals outputted from the A/D converter 9a are inputted into a digital signal processor (DSP) 9b, and then the processed digital signals outputted from the DSP 9b are sent to a memory 9c and a CPU 9d. Of course, in addition to receiving the output from the DSP 9b, it is also possible to input the outputs from the memory 9c and CPU 9d into the DSP 9b.

Now, upon receiving the output of the DSP 9b, the CPU 9d outputs the above-described reset signal RS. Further, the microcomputer 9 is connected to an alarm circuit 6, and when an actual detection target microwave signal is judged to have been received, the CPU 9d sends a detection signal to the alarm circuit 6, and upon receiving such detection signal, the alarm circuit 6 sounds a buzzer 6a.

Further, in the same manner as was described above for the first embodiment, the memory 9c prepares "n" memory blocks (as shown in FIG. 6(b)) to match the resolution of the A/D converter 9 for a single sweep. At this time, if Add0 is made the head address of the memory 9c, and if the data (i.e., the voltage value) sampled by the A/D converter 9a is added as an offset to the head address, then as shown in FIGS. 6(a) and 6(b), the value obtained thereby will form the memory address accessed at such time. Accordingly, by changing the head address for each sweep cycle, it is possible to store the detection state for a number of cycle portions. Further, as an initialization step before beginning a sweep, the DSP 9b clears (i.e., stores 0 in) the memory region that stores data from the current sweep. In this regard, the memory storing operations performed during an actual sweep may be carried out in the same manner as was described above for the first embodiment (e.g., see FIG. 8).

Now, if the sampling cycle is assumed to be 100 $\mu$S, then for one sampling, the sweep stop time will lie within the range 0~200 $\mu$S. Accordingly, because there are 7 samplings in the address corresponding to the voltage A shown in FIG. 8, the sweep stop time will lie within the range 600~800 $\mu$S.

In other words, if the sweep stop time interval (appropriate time interval) that makes it possible to judge that a detection target microwave signal has been detected is divided by the sampling time interval, the number of samplings calculated thereby can be established as a reference value, and then in the case where the number of samplings stored in the memory 9b reaches or exceeds such reference value, it is possible to make the judgement that an actual microwave signal has been detected.

Incidentally, in the case where a faint detection target microwave signal is received, it is possible that the sweep stop generated thereby will be shorter than the reference time in a manner similar to the case of noise, and this unfortunately results in cases where the sweep is restarted. However, even when the number of samplings stored in the memory 9c is less than the reference number, by using the same method described above for the first embodiment (see discussion regarding FIGS. 8 and 9), it becomes possible to detect even faint detection target microwave signals which generate sweep stops over time intervals less than the reference time interval.

In other words, even in the case where each sweep stop time interval (number of samplings) is less than the reference time interval (reference value), if such sweep stops continue to be carried out at the same point during repeated sweeps, it is possible to make the judgement that a detection target microwave signal has been received, whereupon an alarm can be appropriately outputted. Further, in order to carry out such judgement, because data related to a plurality of sweeps needs to be maintained in storage, by appropriately changing the head address, for example, to prevent the storage regions of the data related to each sweep from overlapping with each other, it becomes possible to store sweep data from a plurality of sweeps in the memory 9c, and this makes it possible to carry out judgements based on a plurality of sweeps.

Figure 22:
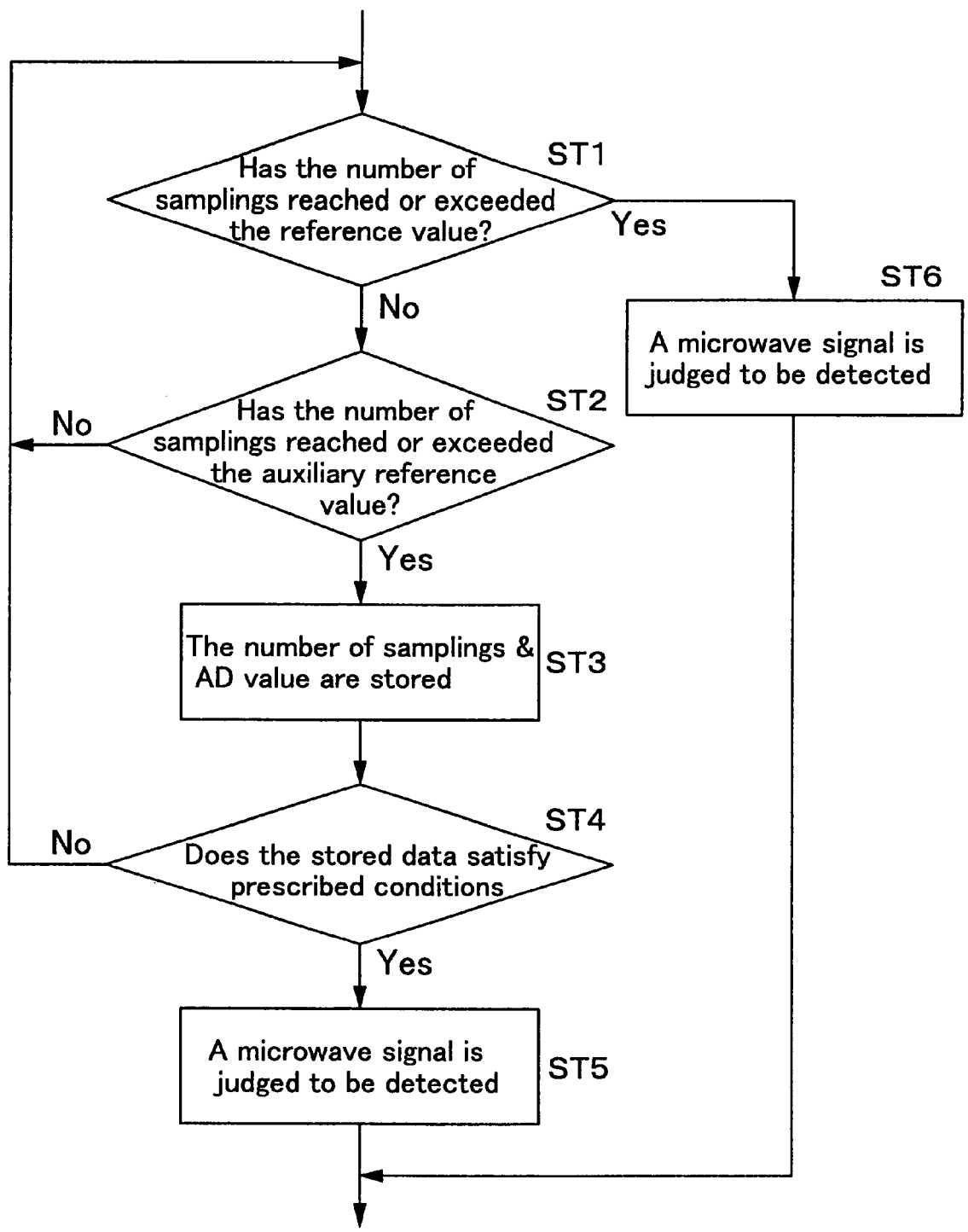
FIG. 22 is a flow chart showing the detection algorithm performed by the microwave detector according to the fifth embodiment of the present invention.

Further, because there is no need for data related to the intervals having no sweep stops, it is possible to carry out operations such as those shown in the flow chart of FIG. 22. Namely, a judgement of whether or not the number of samplings has reached or exceeded the reference value is carried out (ST1), and in the case where the number of samplings reaches or exceeds the reference value, a detection target microwave signal is judged to have been received (ST6), and then a prescribed alarm process is carried out.

On the other hand, in the case where the number of samplings is below the reference value, the process proceeds to Step 2, and a judgement of whether or not the number of samplings has reached or exceeded an auxiliary reference value is carried out (ST2). In this regard, the auxiliary reference value is used for the purpose of judging whether or not sweep stops have been carried out in the case where the number of samplings lies below the reference value.

Now, in the case where the number of samplings lies below the auxiliary reference value, the judgement that no microwave signals and no interference waves have been detected is made, and the process returns to Step 1 to carry out judgements based on the next sweep operation. Further, in the case where the number of samplings reaches or exceeds the auxiliary reference value, the number of samplings and the AD value thereof (i.e., the value obtained from the head address of the data storing addresses) or data related thereto (frequency, voltage, etc.) is stored (ST3). In this way, because only data related to sweep stops needs to be maintained in the memory, data unnecessary for carrying out judgements is not maintained, and this makes it possible to use the memory efficiently. In such case, the memory regions for storing the number of samplings accompanying a sweep may be the same for every sweep.

Then, in the case where the data maintained in memory as described above satisfies prescribed conditions, a detection target microwave signal is judged to be detected (ST4 and ST5). In other words, the conditions are judged to be satisfied when the AD value at the time the current sweep stop is detected occurs at the same position for the sweep stops carried out up to the previous sweep. Further, various judgement references may be established for judging whether or not the prescribed conditions have been satisfied. For example, when taking the number of samplings into consideration, in the case where the number of samplings is relatively large, it is possible to make the judgment that the conditions have been satisfied even when the number of times the detection is repeated is small, and in the case where the number of times the detection is repeated is large, it is possible to make the judgment that the conditions have been satisfied even when the number of samplings is small.

Further, the resolution level of the A/D converter 9a is established in accordance with the accuracy desired for measurements of the sweep stop time. For example, in the case where an accuracy which makes it possible to measure sweep stops of about 1mS is required, the sampling rate may be set at approximately several kHz. Further, in the present embodiment, because the sweep stop time (number of samplings) may be calculated without having to carry out direct measurements, the A/D converter 9c does not need to be a high accuracy A/D converter. In this way, because the probability that noise will be picked up as a detection microwave signal is reduced, there is no need for the sweep stops to be carried out longer than is necessary.

Figure 23:
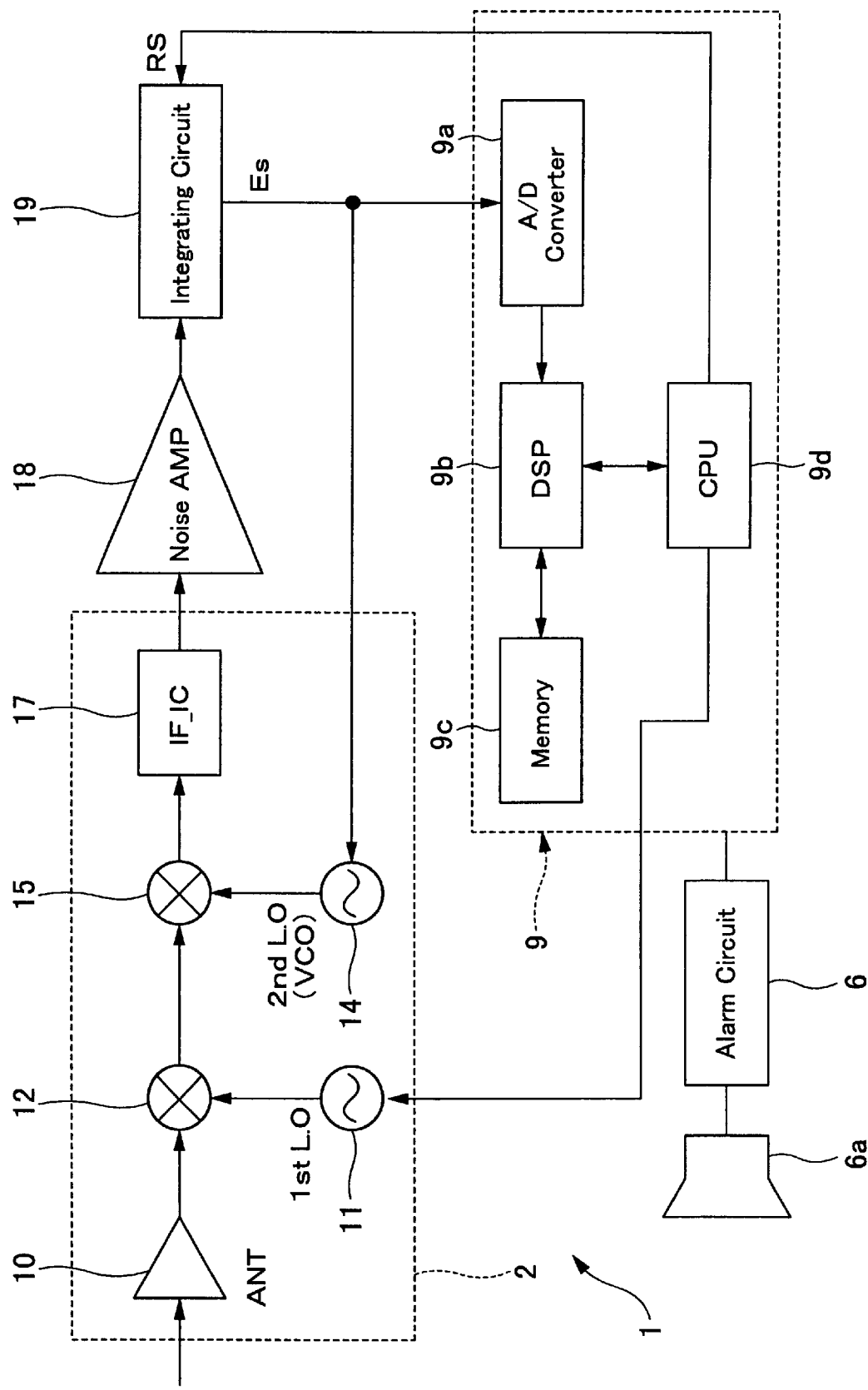
FIG. 23 is a block circuit diagram showing the overall structure of a microwave detector according to a sixth embodiment of the present invention.

Next, a sixth embodiment of a microwave detector according to the present invention will be described. First, as shown in the block diagram of FIG. 23, a microwave detector 20 according the sixth embodiment has a structure that is basically the same as that of the microwave detector according to the fifth embodiment. Accordingly, the elements of the sixth embodiment that are the same as the elements of the fifth embodiment will be identified by the same reference numbers, and a detailed description of such elements will be omitted.

However, in contrast with the microwave detector of the fifth embodiment in which the first local oscillator 11 is normally operated continuously at a fixed output, in the microwave detector 20 of the present embodiment, the first local oscillator 11 is operated intermittently. Namely, the output of the first local oscillator 11 is switched ON and OFF by the CPU 9d in the microcomputer 9.

Figure 24:
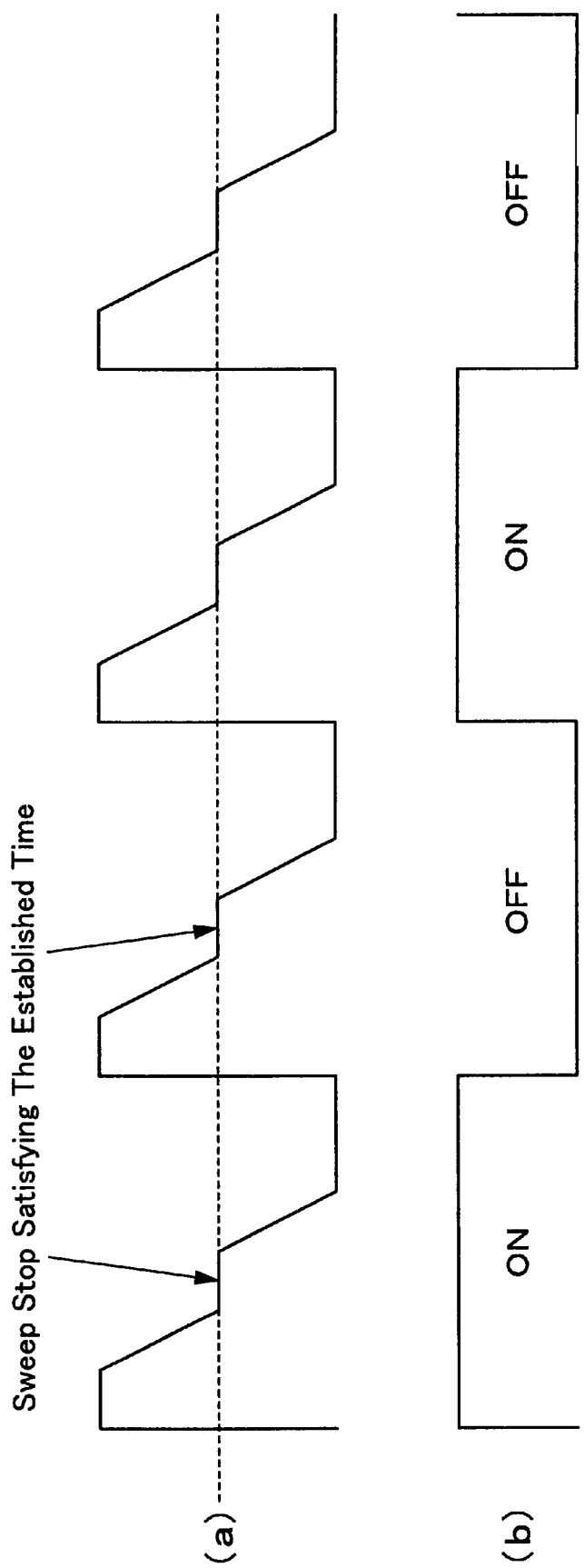
FIGS. 24(a) and 24(b) are waveform diagrams used in describing the oscillation timing of the local oscillator in the microwave detector according to the sixth embodiment of the present invention.

In this connection, FIG. 24 shows the ON/OFF timing of the first local oscillator. Namely, as shown in FIG. 24, in the case where the oscillation state of the first local oscillator 11 begins in an ON state, at the end of the sweep interval of the first sweep completed by the second local oscillator 14, the oscillation state of the first local oscillator 11 is switched to an OFF state for the interval of the next sweep (i.e., the second sweep). Then, at the end of the second sweep, the oscillation state of the first local oscillator 11 is switched back to the ON state for the duration of the third sweep, and this process of alternately switching between the ON state and the OFF state is carried out for all sweeps.

In this way, by employing a synchronous detector structure in the present embodiment, the number of inputs in each of the addresses written into the memory regions of the memory 9c during the sweep intervals in which the oscillation state of the first local oscillator is in an OFF state can be utilized as a negative element in judging whether or not a detected microwave signal is an actual detection target microwave signal or a false signal.

Namely, in the case where there is a large number of samplings in the memory regions corresponding to the sweep intervals over which the oscillation state of the first local oscillator is in an OFF state, there is a high probability that the detected microwave signal is not an actual detection target microwave signal. Accordingly, in such case where a detection signal appears (i.e., in the case where there is a high number of samplings) during the time that the oscillation state of the first local oscillator is in an OFF state, the detected signal may be judged to be due to noise, or various other judgement methods may be employed, such as defining strict conditions for the detection of an actual microwave signal while no noise judgements are made.

Further, in both the fifth and six embodiments described above, the DSP 9b, the memory 9c and the CPU 9d may all be constructed from separate chips or all the functions carried out thereby may be handled by a single integrated chip, and in the case where separate chips are used, each chip may be constructed from a plurality of elements. In this connection, because the signal processing carried out by the microwave detector according to the fifth and sixth embodiments of the present invention is simpler than that carried out by prior art microwave detectors, in accordance with the recent development of a high performance DSP, it is also possible to employ a single chip microcomputer or a DSP equipped with all the microcomputer elements such as the A/D converter 9a, the memory 9c, the CPU 9d and the like.

As described above in the embodiments of a microwave detector according to the present invention, a prescribed reference level is established for comparison with digital signals created from data used for making a judgement of whether or not an actual microwave signal has been detected. In such arrangement, the percentage of instances where the reference level is reached or exceed in the case where no microwave signals are received and only noise is present will be roughly the same for each sweep, but because the percentage of such instances where the reference level is reached or exceeded will be larger for the case where a detection target microwave signal is received, it is possible to reliably detect the reception of an actual detection target microwave signal even in the case where the received microwave signal has a faint signal strength which makes it difficult to discriminate the microwave signal from the noise level. Further, by establishing the reference level at an appropriate value to enable detection of a portion of the noise, it becomes possible to carry out a more reliable detection of microwave signals.

Furthermore, in the case where a microwave signal is received, because the there will be a long time interval over which the reference level continues to be reached or exceeded, a judgement of whether or not a microwave signal has been received can be carried out based on the sweep stop interval of the sweep carried out in accordance with the digital signals or the output state of the digital signals.

What is claimed is:

1. A microwave detector, comprising:

heterodyne-type reception means equipped with an antenna for picking up microwave signals, a local oscillator for carrying out sweep operations, and a mixer for frequency mixing an output from the antenna with an output from the local oscillator, wherein the heterodyne reception means outputs detected wave signals based on an output from the mixer;

a digital processing portion for receiving the detected wave signals outputted from the reception means, the digital processing portion further for outputting a high pulse when a level of the detected wave signals reaches or exceeds a prescribed reference level, and a low pulse when the level of the detected wave signals is below the reference level;

sweep control means for controlling a sweep operation of the local oscillator based on the high and low pulses outputted from the digital processing portion; and judgment means for judging whether or not a detection target microwave signal has been detected based on at least a time duration of the high pulses outputted by the digital processing portion.

2. A microwave detector, comprising:

heterodyne-type reception means equipped with an antenna for picking up microwave signals, a local oscillator for carrying out sweep operations, and a mixer for frequency mixing an output from the antenna with an output from the local oscillator, wherein the heterodyne reception means outputs detected wave signals based on an output from the mixer;

a digital processing portion for receiving the detected wave signals outputted from the reception means, the digital processing portion further for outputting a high pulse when a level of the detected wave signals reaches or exceeds a prescribed reference level, and a low pulse when the level of the detected wave signals is below the reference level;

sweep control means for controlling a sweep operation of the local oscillator based on the high and low pulses outputted from the digital processing portion;

a judgment-use digital pulse generating portion for receiving the detected wave signals outputted from the reception means, the judgment-use digital pulse generating portion further for outputting a high pulse when the level of the detected wave signals reaches or exceeds a prescribed threshold level, and a low pulse when the level of the detected wave signals is below the threshold level; and judgment means for judging whether or not a detection target microwave signal has been detected based on at least the total time of the high pulses outputted by the judgment-use digital pulse generating portion.

3. The microwave detector according to claim 2, wherein the threshold level is set at a level which enables detection of a portion of the noise outputted by the reception means.

4. The microwave detector according to claim 2, wherein the judgment-use digital pulse generating portion is further equipped with a discrimination function for discriminating whether the detected wave signals outputted from the reception means are probably detection target microwave signals or are probably noise.

5. The microwave detector according to claim 2, wherein the threshold level is set at a different level than the reference level.

6. A microwave detector, comprising:

heterodyne-type reception means equipped with an antenna for picking up microwave signals, a local oscillator for carrying out sweep operations, and a mixer for frequency mixing an output from the antenna with an output from the local oscillator, wherein the heterodyne reception means outputs detected wave signals based on an output from the mixer;

a digital processing portion for receiving the detected wave signals outputted from the reception means, the digital processing portion further for outputting a high pulse when a level of the detected wave signals reaches or exceeds a prescribed reference level, and a low pulse when the level of the detected wave signals is below the reference level;

sweep control means for receiving an output from the digital processing portion, and for carrying out a sweep stop when high pulses are received, the sweep stop having a sweep position; and judgment means for judging whether or not a detection target microwave signal has been detected based on whether or not the total time over which sweep stops are carried out at the sweep position reach or exceed a prescribed sweep stop reference time.

7. The microwave detector according to claim 6, wherein the sweep position is a frequency value.

8. The microwave detector according to claim 6, wherein the sweep position is a voltage value corresponding to a detected frequency value.

9. A microwave detector, comprising:

heterodyne-type reception means equipped with an antenna for picking up microwave signals, a local oscillator for carrying out sweep operations, and a mixer for frequency mixing an output from the antenna with an output from the local oscillator, wherein the heterodyne reception means outputs detected wave signals based on an output from the mixer;

a digital processing portion for receiving the detected wave signals outputted from the reception means, the digital processing portion further for outputting a high pulse when a level of the detected wave signals reaches or exceeds a prescribed reference level, and a low pulse when the level of the detected wave signals is below the reference level;

wavesweep control means for receiving an output from the digital processing portion, and for carrying out a sweep stop when high pulses are received; and judgment means for judging whether or not a detection target microwave signal has been detected based on whether or not the total time required for a single sweep reaches or exceeds a prescribed sweep reference time.

10. The microwave detector according to any one of claims 1 or 6 or 9, further comprising:

a discrimination means for carrying out a discrimination process on the output from the digital processing portion to discriminate whether the detected wave signals outputted from the reception means are probably detection target microwave signals or are probably noise.

11. The microwave detector according to any one of claims 1 or 2 or 6 or 9, wherein the reference level is set at a level which enables detection of a portion of the noise outputted by the reception means.

12. The microwave detector according to any one of claims 1 or 2 or 6 or 9, wherein the operations performed by the digital processing portion and the judgment means on the detected wave signals outputted from the reception means are carried out over prescribed sampling intervals.

13. The microwave detector according to any one of claims 1 or 2 or 6 or 9, wherein the digital processing portion is further equipped with a discrimination function for discriminating whether the detected wave signals outputted from the reception means are probably detection target microwave signals or are probably noise.

14. The microwave detector according to any one of claims 1 or 2 or 6 or 9, wherein a prescribed plurality of sweeps are carried out with the judgment results thereof being integrated to form integrated judgment data, and the judgment of whether or not a detection target microwave signal has been detected is carried out based on the integrated judgment data.

15. The microwave detector according to any one of claims 1 or 2 or 6 or 9, wherein the sweep range of each sweep is divided into a prescribed plurality of divided sweep regions, and a judgment process is carried out for each divided sweep region.

16. The microwave detector according to claim 15, wherein the digital processing portion is further equipped with a discrimination function for discriminating whether the detected wave signals outputted from the reception means are probably detection target microwave signals or are probably noise, and a memory storing function for creating memory regions corresponding to the divided sweep regions in which the detected wave signals outputted from the reception means have been discriminated as probably being detection target microwave signals, and for storing data related to the detected wave signals in the corresponding memory regions, and the judgment means carries out a judgment based on the data stored in the memory regions, created for the divided sweep regions.

17. The microwave detector according to claim 16, wherein the data that is stored in the memory region includes data on the number of sweeps related thereto.

18. The microwave detector according to claim 16, further comprising:

a clearing function for clearing the memory regions corresponding to sweep regions that have been judged to receive no detection target microwave signals.

19. The microwave detector according to any one of claims 1 or 2 or 6 or 9, wherein the sweep control means changes the sweep operation performed by the local oscillator in a stepwise manner based on the high or low pulses outputted from the digital processing portion.

* * * * *